US011769990B2

(12) United States Patent
Kondo et al.

(10) Patent No.: US 11,769,990 B2
(45) Date of Patent: Sep. 26, 2023

(54) LIGHT-EMITTING ELEMENT ARRAY, LIGHT EMITTING DEVICE, OPTICAL DEVICE, MEASUREMENT DEVICE AND INFORMATION PROCESSING APPARATUS

(71) Applicant: FUJIFILM Business Innovation Corp., Tokyo (JP)

(72) Inventors: Takashi Kondo, Kanagawa (JP); Daisuke Iguchi, Kanagawa (JP); Tomoaki Sakita, Kanagawa (JP); Yoshinori Shirakawa, Kanagawa (JP); Seiji Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 230 days.

(21) Appl. No.: 17/123,060

(22) Filed: Dec. 15, 2020

(65) Prior Publication Data
US 2021/0296861 A1 Sep. 23, 2021

(30) Foreign Application Priority Data

Mar. 17, 2020 (JP) ................. 2020-046693

(51) Int. Cl.
*H01S 5/42* (2006.01)
*G01B 11/24* (2006.01)
(Continued)

(52) U.S. Cl.
CPC ............. *H01S 5/423* (2013.01); *G01B 11/24* (2013.01); *G06F 21/36* (2013.01); *G06V 20/64* (2022.01); *G06V 40/172* (2022.01)

(58) Field of Classification Search
CPC ......... G01B 11/24; G06F 21/36; H01S 5/423; H01S 5/0071; H01S 5/02345;
(Continued)

(56) References Cited

U.S. PATENT DOCUMENTS 7,948,004 B2 5/2011 Suzuki
10,723,139 B2 * 7/2020 Mattes ................. B41J 2/455

FOREIGN PATENT DOCUMENTS

JP H01238962 9/1989
JP 2001308385 11/2001
JP 2009286048 12/2009

\* cited by examiner

*Primary Examiner* — Tri T Ton
(74) *Attorney, Agent, or Firm* — JCIPRNET

(57) ABSTRACT

A light-emitting element array includes multiple light-emission instruction units arranged in a first direction; a first light-emitting element group row including light-emitting element groups each including a multiple light-emitting elements such that the light-emitting element groups are arranged in a direction intersecting the first direction; a second light-emitting element group row including light-emitting element groups each including a multiple light-emitting elements such that the second light-emitting element group row is arranged along the first light-emitting element group row in the first direction; and a multiple wiring lines that connect the multiple light-emission instruction units to the light-emitting element groups in the first light-emitting element group row and the light-emitting element groups in the second light-emitting element group row to provide a light-emission instruction. The multiple wiring lines are connected such that in response to the multiple light-emission instruction units sequentially providing a light-emission instruction in the first direction, the light-emitting element groups in the first light-emitting element group row sequentially emit light in the direction intersecting the first direction and, after turning on of the first light-emitting element group row is completed, the light-emitting element groups in the second light-emitting element group row sequentially emit light in the direction intersecting the first direction.

20 Claims, 13 Drawing Sheets

(51) Int. Cl.
*G06F 21/36* (2013.01)
*G06V 20/64* (2022.01)
*G06V 40/16* (2022.01)

(58) Field of Classification Search
CPC ............... H01S 5/0261; H01S 5/04256; H01S 5/04257; G01S 17/89; G01S 7/4815; G01S 7/4817; G06V 20/64; G06V 40/172
USPC .......................................... 356/121–123, 601
See application file for complete search history.

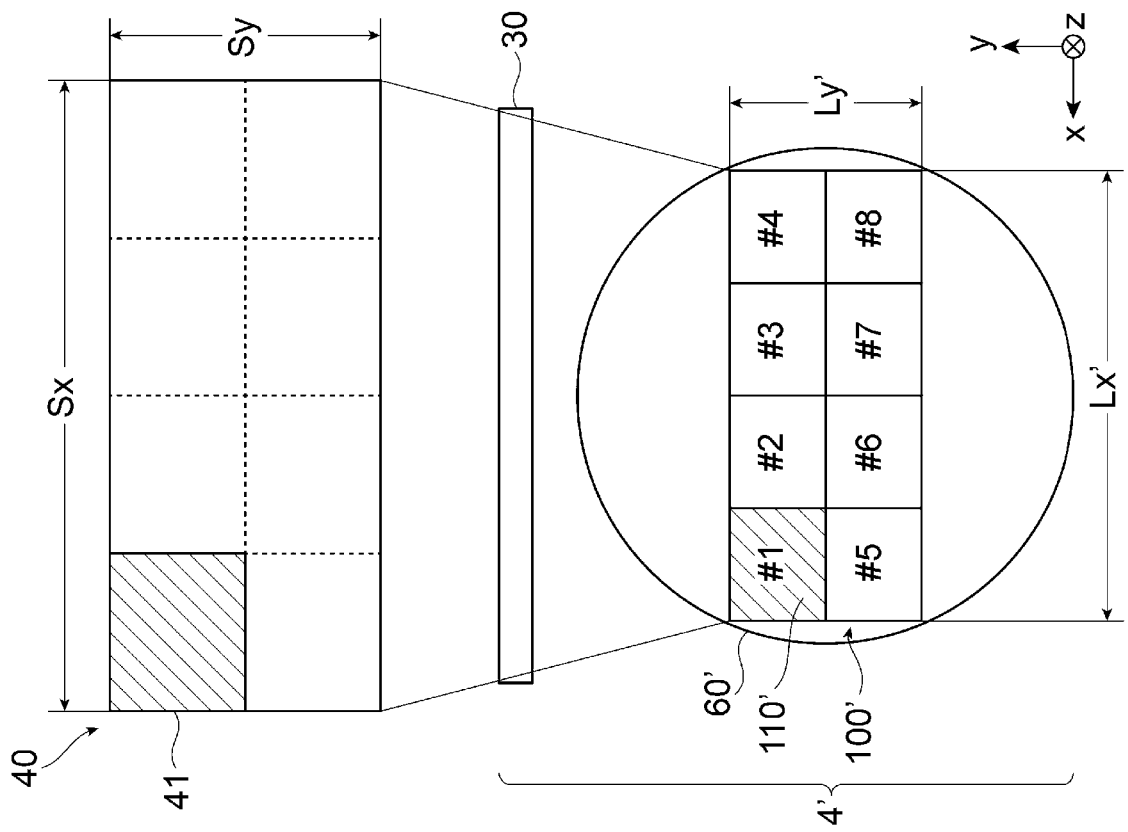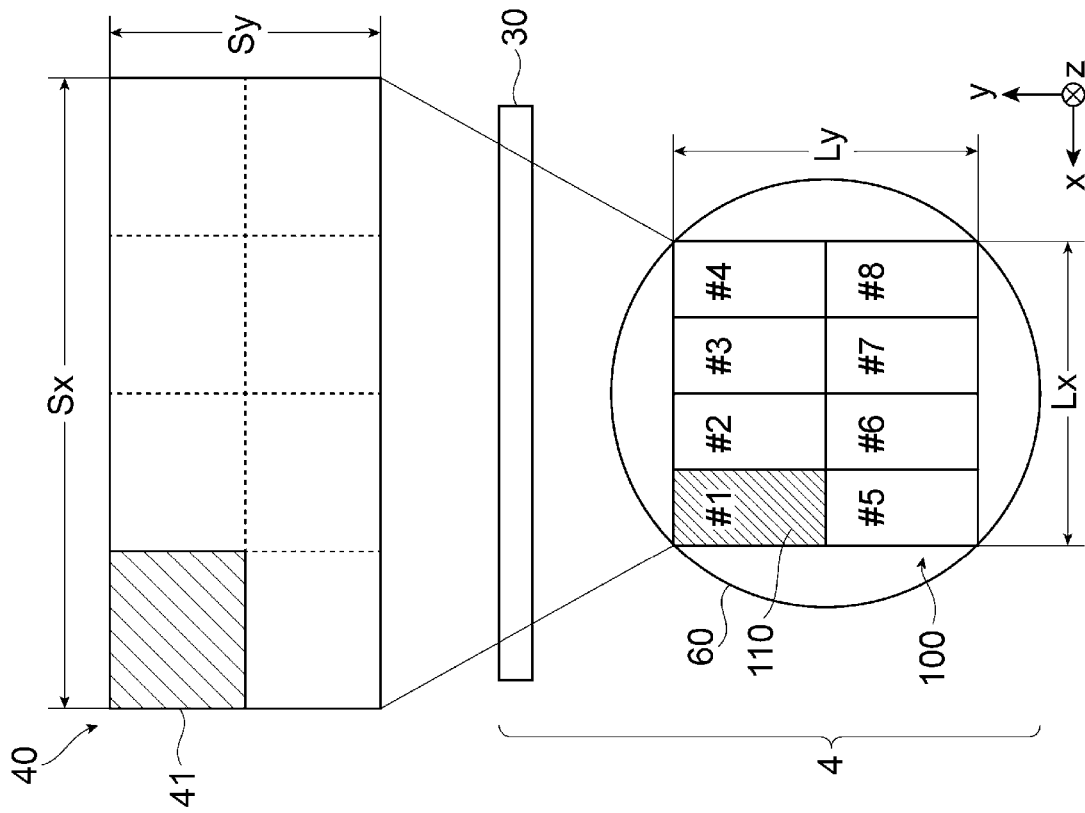

ately, aspects of the non-limiting embodiments are not required to address the advantages described above, and aspects of the non-limiting embodiments of the present disclosure may not address advantages described above.

LIGHT-EMITTING ELEMENT ARRAY, LIGHT EMITTING DEVICE, OPTICAL DEVICE, MEASUREMENT DEVICE AND INFORMATION PROCESSING APPARATUS

CROSS-REFERENCE TO RELATED APPLICATIONS

This application is based on and claims priority under 35 USC 119 from Japanese Patent Application No. 2020-046693 filed Mar. 17, 2020.

BACKGROUND

(i) Technical Field

The present disclosure relates to a light-emitting element array, a light emitting device, an optical device, a measurement device, and an information processing apparatus.

(ii) Related Art

Japanese Unexamined Patent Application Publication No. 01-238962 describes a light-emitting element array including a one-dimensionally, two-dimensionally, or three-dimensionally arranged light-emitting elements capable of controlling a threshold voltage or threshold current by using light from outside. The light-emitting element array is configured such that at least a portion of light generated from each light-emitting element enters another light-emitting element in the vicinity of the light-emitting element. Each light-emitting element is connected to a clock line for applying a voltage or current from outside.

Japanese Unexamined Patent Application Publication No. 2001-308385 describes a self-scanning light emitting device including a light-emitting element having a six-layer pnpnpn semiconductor structure. The p-type first layer and the n-type sixth layer at both ends and the p-type third layer and the n-type fourth layer at the center are each provided with an electrode such that the pn layers have a light-emitting diode function and the four pnpn layers have a thyristor function.

Japanese Unexamined Patent Application Publication No. 2009-286048 describes a self-scanning light source head including a substrate, surface-emitting semiconductor lasers arranged in an array on the substrate, and at least one thyristor disposed on the substrate and serving as a switching element for selectively turning on or off light emission of the surface-emitting semiconductor lasers.

SUMMARY

To measure the three-dimensional shape of a measurement target object in accordance with a method using the flight time of light, called the time-of-flight (ToF) method, the measurement target object may be irradiated with light from a plurality of light-emitting element groups.

Aspects of non-limiting embodiments of the present disclosure relate to easy formation of a plurality of wiring lines along which light-emission instruction units, each provided for one of a plurality of light-emitting element groups each including a plurality of light-emitting elements, provide a light-emission instruction to the light-emitting element groups, compared with a case where the light-emitting element groups are caused to emit light in a direction in which the light-emission instruction units sequentially provide a light-emission instruction to the light-emitting element groups.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emitting element array including a plurality of light-emission instruction units arranged in a first direction; a first light-emitting element group row including light-emitting element groups each including a plurality of light-emitting elements such that the light-emitting element groups are arranged in a direction intersecting the first direction; a second light-emitting element group row including light-emitting element groups each including a plurality of light-emitting elements such that the second light-emitting element group row is arranged along the first light-emitting element group row in the first direction; and a plurality of wiring lines that connect the plurality of light-emission instruction units to the light-emitting element groups in the first light-emitting element group row and the light-emitting element groups in the second light-emitting element group row to provide a light-emission instruction. The plurality of wiring lines are connected such that in response to the plurality of light-emission instruction units sequentially providing a light-emission instruction in the first direction, the light-emitting element groups in the first light-emitting element group row sequentially emit light in the direction intersecting the first direction and, after turning on of the first light-emitting element group row is completed, the light-emitting element groups in the second light-emitting element group row sequentially emit light in the direction intersecting the first direction.

BRIEF DESCRIPTION OF THE DRAWINGS

Exemplary embodiments of the present disclosure will be described in detail based on the following figures, wherein:

FIG. 5A illustrates an arrangement region of a light emitting device to which a first exemplary embodiment is applied;

FIG. 5B illustrates an arrangement region of a light emitting device to which the first exemplary embodiment is not applied;

DETAILED DESCRIPTION

The following describes exemplary embodiments of the present disclosure in detail with reference to the accompanying drawings.

Some measurement devices measure the three-dimensional shape of a measurement target object in accordance with a method using the flight time of light, called the time-of-flight (ToF) method. The ToF method involves measuring the time from the timing at which light is emitted from a light emitting device included in a measurement device to the timing at which the emitted light is reflected by a measurement target object and received by a three-dimensional sensor (hereinafter referred to as "3D sensor") included in the measurement device, and specifying the three-dimensional shape of the measurement target object from the measured time. An object whose three-dimensional shape is to be measured is referred to as a measurement target object. A three-dimensional shape is sometimes referred to as a three-dimensional image. Measurement of a three-dimensional shape is sometimes referred to as three-dimensional measurement, 3D measurement, or 3D sensing.

The measurement device described above is mounted in a mobile information processing apparatus or the like and is used to authenticate the face of a user who is to access the information processing apparatus. A typical mobile information processing apparatus or the like uses a method for authenticating a user by using a password, a fingerprint, an iris, or the like. A demand has recently increased for higher-security authentication methods. Accordingly, there has become available a mobile information processing apparatus provided with a measurement device for measuring a three-dimensional shape. Specifically, the three-dimensional shape of the face of an accessing user is acquired, and whether the access is permitted is determined. Only when the user is authenticated to access the mobile information processing apparatus, the user is permitted to use the mobile information processing apparatus.

In one example, the information processing apparatus is a mobile information processing terminal configured to recognize the shape of a user's face captured as a three-dimensional shape to authenticate the user. The information processing apparatus is applicable to an information processing apparatus such as a personal computer (PC) other than a mobile information processing terminal.

The configuration, function, method, and the like described in this exemplary embodiment are also applicable to the recognition of a measurement target object, other than the face, from the measured three-dimensional shape thereof. The measurement device described above is also applicable to technologies for continuously measuring the three-dimensional shape of a measurement target object, such as augmented reality (AR). There is no restriction on the distance to the measurement target object.

First Exemplary Embodiment

Information Processing Apparatus 1

Figure 1:
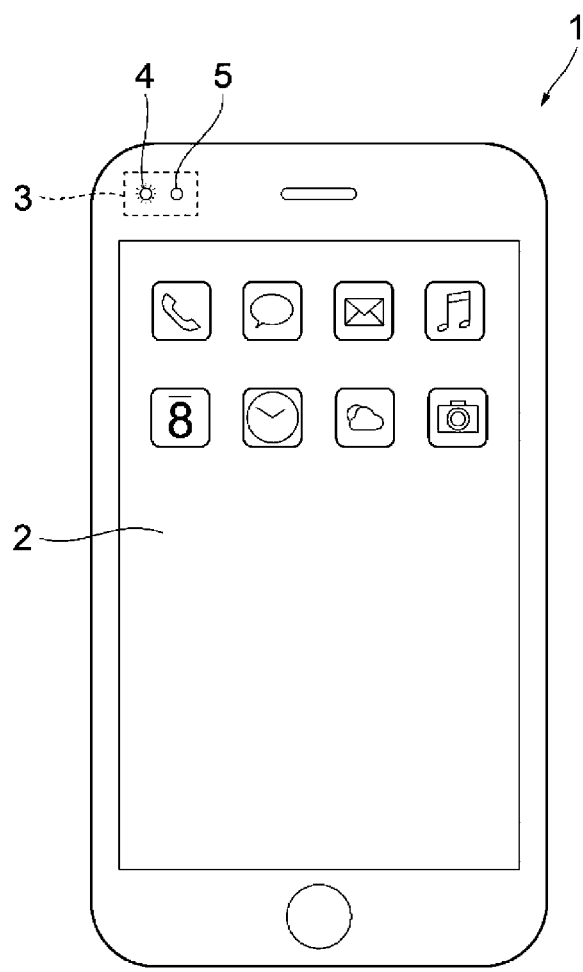
FIG. 1 illustrates an example of an information processing apparatus.

FIG. 1 illustrates an example of an information processing apparatus 1. As described above, in one example, the information processing apparatus 1 may be a mobile information processing terminal.

The information processing apparatus 1 includes a user interface (UI) unit 2 and an optical device 3 that measures a three-dimensional shape. The UI unit 2 is formed by, for example, integrating a display device that displays information to a user, and an input device that receives an instruction for information processing in accordance with the operation of the user. Examples of the display device include a liquid crystal display and an organic electroluminescent (EL) display. Examples of the input device include a touch panel.

The optical device 3 includes a light emitting device 4 and a three-dimensional sensor (hereinafter referred to as "3D sensor") 5. The light emitting device 4 emits light toward the measurement target object, namely, a face in this example. The 3D sensor 5 acquires light emitted from the light emitting device 4 and reflected by and returning from the face. By way of example, the 3D sensor 5 measures a three-dimensional shape in accordance with a method using the flight time of light, called the ToF method. Then, the three-dimensional shape of the face is specified from the three-dimensional shape. As described above, the three-dimensional shape of a measurement target object other than the face may be measured. The 3D sensor 5 is an example of a light receiving unit.

The information processing apparatus 1 is configured as a computer including a central processing unit (CPU), a read-only memory (ROM), a random access memory (RAM), and so on. The ROM includes a non-volatile rewritable memory such as a flash memory. A program and constants accumulated in the ROM are loaded into the RAM, and the CPU executes the program to activate the information processing apparatus 1. Accordingly, various information processing operations are performed.

Figure 2:
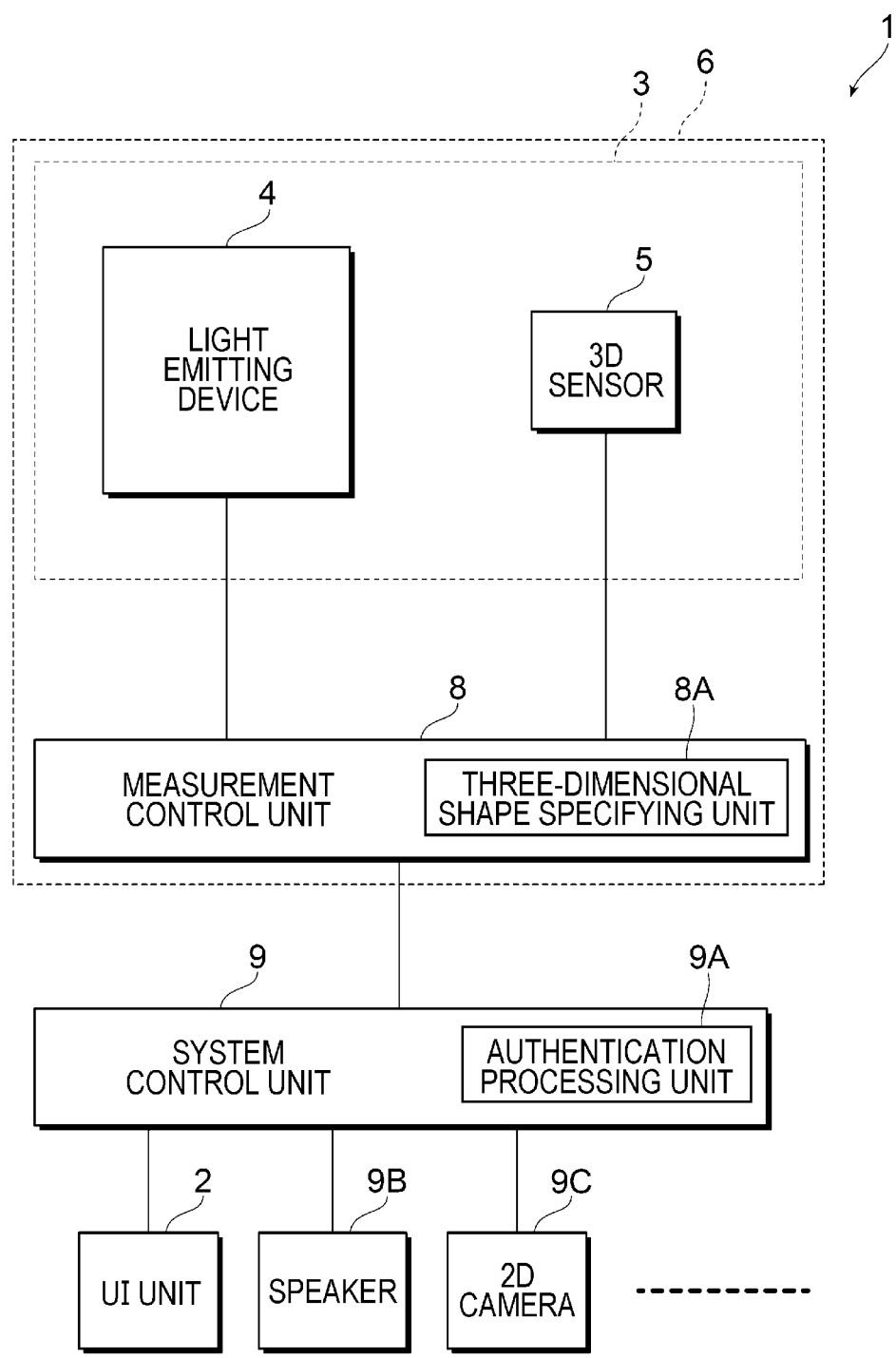
FIG. 2 is a block diagram illustrating the configuration of the information processing apparatus.

FIG. 2 is a block diagram illustrating the configuration of the information processing apparatus 1.

The information processing apparatus 1 includes the optical device 3 described above, a measurement control unit 8, and a system control unit 9. The measurement control unit 8 controls the optical device 3. The measurement control unit 8 includes a three-dimensional shape specifying unit 8A. The system control unit 9 controls the entire information processing apparatus 1 as a system. The system control unit 9 includes an authentication processing unit 9A. The system control unit 9 is connected to the UI unit 2, a speaker 9B, a two-dimensional (2D) camera 9C, and so on.

The three-dimensional shape specifying unit 8A of the measurement control unit 8 measures a three-dimensional shape from reflected light from the measurement target object and specifies the three-dimensional shape of the measurement target object. The authentication processing unit 9A of the system control unit 9 authenticates a user permitted to access the information processing apparatus 1 by identifying whether the user is permitted to access the information processing apparatus 1 from the three-dimensional shape specified by the three-dimensional shape specifying unit 8A.

In FIG. 2, a measurement device 6 includes the optical device 3 and the measurement control unit 8.

Light Emitting Device 4

Figure 3:
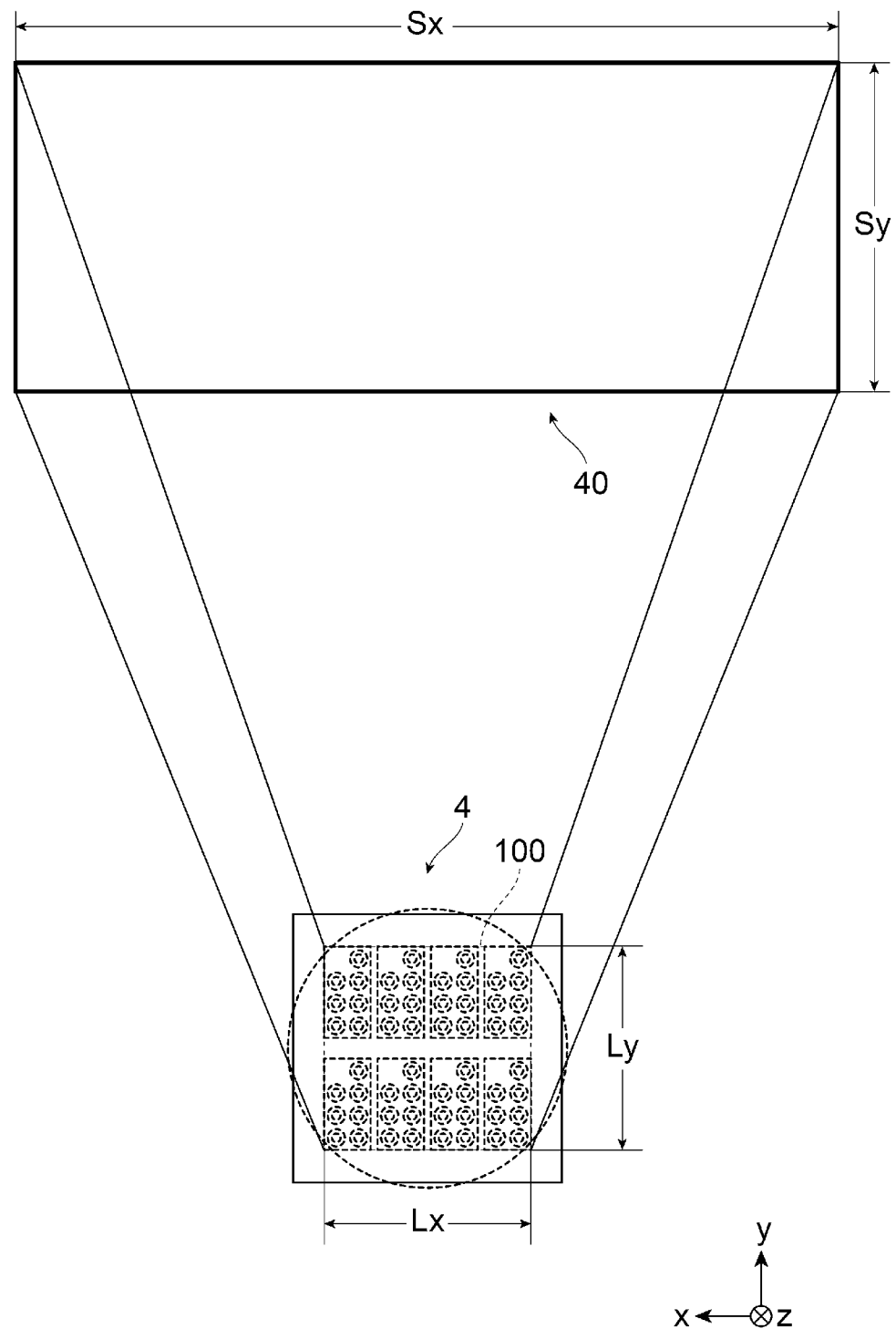
FIG. 3 illustrates a measurement target object irradiated with light emitted from a light emitting device.

FIG. 3 illustrates a measurement target object irradiated with light emitted from the light emitting device 4. In FIG. 3, the light emitting device 4 is illustrated as viewed from a side opposite to the side from which light is emitted. The side opposite to the side from which light is emitted is referred to as the back side. The light emitting device 4 is arranged so as to face an irradiation region 40. In FIG. 3, the light emitting device 4 and the irradiation region 40 are illustrated to be displaced from each other in the vertical direction. The irradiation region 40 is a region that lies on a plane perpendicular to the direction of light propagation at a certain distance in the direction of emission of light from the light emitting device 4 and that is irradiated with light emitted from the light emitting device 4 toward the measurement target object. In FIG. 3, the leftward direction is defined as the x direction, the upward direction is defined as the y direction, and the direction away from the viewer is defined as the z direction.

The irradiation region 40 has a length Sx in the x direction and a length Sy in the y direction. The length Sx in the x direction is larger than the length Sy in the y direction (Sx>Sy). That is, the irradiation region 40 has a shape whose longitudinal direction is the x direction.

As described below, the light emitting device 4 is configured such that surface-emitting laser element groups each including a plurality of surface-emitting laser elements are two-dimensionally arranged in an arrangement region 100. The arrangement region 100 has a length Lx in the x direction and a length Ly in the y direction. The ratio of the length Lx in the x direction to the length Ly in the y direction, that is, the aspect ratio of the arrangement region 100, is set to be close to 1:1. Desirably, the length Lx in the x direction is greater than or equal to 0.8 times and less than or equal to 1.2 times the length Ly in the y direction. More desirably, the length Lx in the x direction is greater than or equal to 0.9 times and less than or equal to 1.1 times the length Ly in the y direction. Still more desirably, the length Lx in the x direction is greater than or equal to 0.95 times and less than or equal to 1.05 times the length Ly in the y direction.

As described above, the shape of the arrangement region 100 in which a plurality of surface-emitting laser element groups of the light emitting device 4 are arranged is not set to be similar to but is set to be different from the shape of the irradiation region 40. The x direction is an example of a first direction, and the y direction is an example of a direction intersecting the first direction and is an example of a second direction.

Figure 4A:
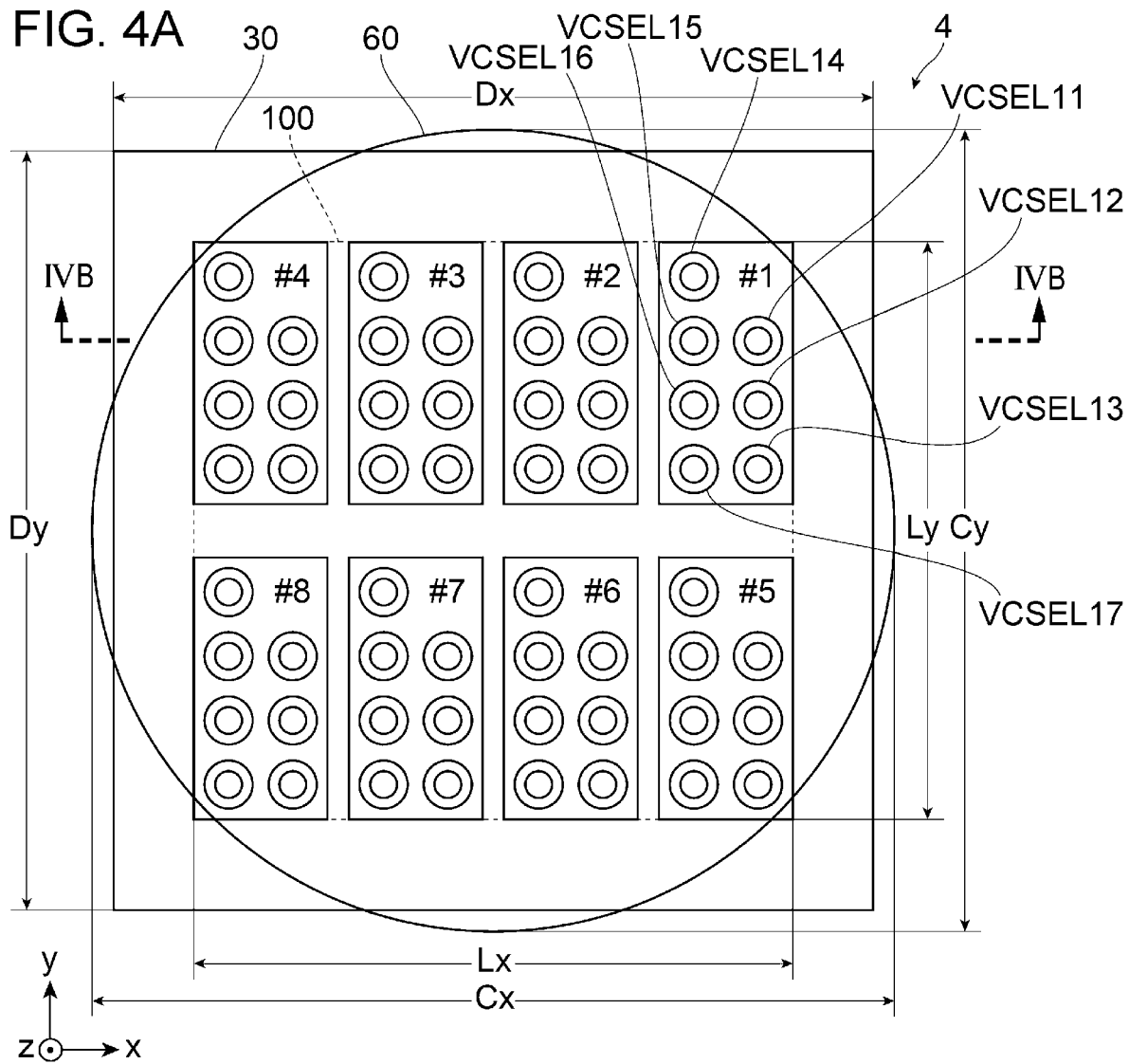
FIG. 4A is a plan view of the light emitting device.
Figure 4B:
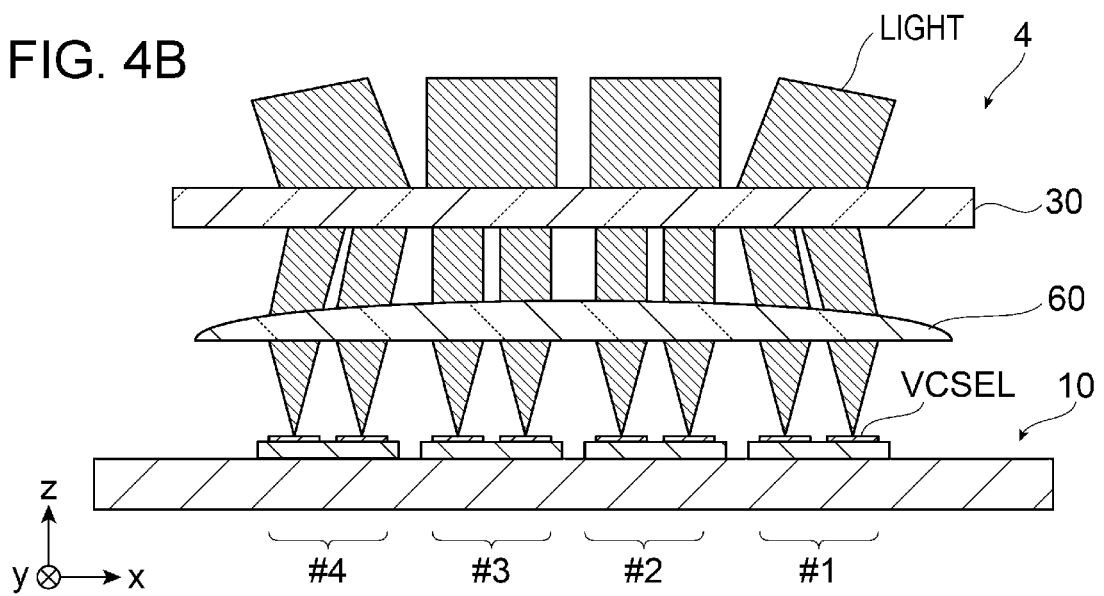
FIG. 4B is a cross-sectional view of the light emitting device taken along line IVB-IVB in FIG. 4A.

FIGS. 4A and 4B illustrate the light emitting device 4. FIG. 4A is a plan view of the light emitting device 4, FIG. 4B is a cross-sectional view of the light emitting device 4 taken along line IVB-IVB in FIG. 4A. In FIG. 4A, unlike FIG. 3, the light emitting device 4 is illustrated as viewed from the side from which light is emitted. The side from which light is emitted is referred to as the front side). In FIG. 4A, accordingly, the rightward direction is defined as the x direction, the upward direction is defined as the y direction, and the direction toward the viewer is defined as the z direction. The plan view is a view of the light emitting device 4 when seen from the positive (+) z direction. In FIG. 4B, the rightward direction is defined as the x direction, the upward direction is defined as the z direction, and the direction away from the viewer is defined as the y direction.

As illustrated in FIG. 4B, the light emitting device 4 includes a surface emitting laser element array 10, a condenser lens 60, and a diffusion member 30 from bottom to top (from the negative (−) to positive (+) y direction).

The surface emitting laser element array 10 includes a plurality of surface-emitting laser elements. In one example, each surface-emitting laser element is a vertical cavity surface emitting laser (VCSEL) element. In the following description, each light-emitting element is a vertical cavity surface emitting laser element VCSEL. The vertical cavity surface emitting laser element VCSEL is referred to as "VCSEL". Accordingly, the surface emitting laser element array 10 is referred to as "VCSEL array 10". In FIG. 4B, light is schematically illustrated by shading. The surface-emitting laser elements and the vertical cavity surface emitting laser elements VCSEL are an example of light-emitting elements, and the surface emitting laser element array 10 is an example of a light-emitting element array.

As illustrated in FIG. 4A, each surface-emitting laser element group is constituted by a plurality of surface-emitting laser elements (VCSELs). The surface-emitting laser element group is referred to as "VCSEL group". VCSEL groups are arranged in the arrangement region 100. As illustrated in FIG. 4A, the arrangement region 100 includes eight VCSEL groups each including seven VCSELs. The VCSEL groups are represented by VCSEL groups #1 to #8 when distinguished from one another. The VCSEL groups are arranged such that four VCSEL groups are aligned in the x direction and two VCSEL groups are aligned in the y direction. That is, in the arrangement region 100, the number of VCSEL groups in the x direction is larger than the number of VCSEL groups in the y direction. The VCSEL groups are an example of light-emitting element groups.

The seven VCSELs in each VCSEL group are arranged such that two VCSELs are aligned in the x direction and four VCSELs are aligned in the y direction. In FIG. 4A, no VCSEL is disposed in the upper right corner of each VCSEL group. This is because p-type ohmic electrodes are disposed (see FIG. 8 described below). The positions of the p-type ohmic electrodes may be changed, and a VCSEL may be disposed in the upper right corner of each VCSEL group. In the foregoing description, this is why two VCSELs are disposed in the x direction and four VCSELs are disposed in the y direction. That is, in each VCSEL group, the number of VCSELs in the y direction is larger than the number of VCSELs in the x direction.

Given that a VCSEL of each VCSEL groups is represented by a VCSEL ij (i≥1 and j≥1), "i" represents the number of the VCSEL group and "j" represents the number of the VCSEL in the VCSEL group. In the illustrated example, the VCSEL group #1 includes VCSELs 11 to 17. As indicated by the VCSEL group #1 illustrated in FIG. 4A, in each VCSEL group, the VCSELs ij with j being 1 to 3 and the VCSELs ij with j being 4 to 8 are arranged in the negative y direction. The VCSELs ij with j being 1 to 3 are arranged in parallel with the VCSELs ij with j being 4 to 8 in the negative x direction. In this case, the VCSEL i1 and the VCSEL i5 are arranged side by side in the x direction, the VCSEL i2 and the VCSEL i6 are arranged side by side in the x direction, and the VCSEL i3 and the VCSEL i7 are arranged side by side in the x direction.

As used herein, the phrase "A to B", where A and B are numbers, is used to indicate a plurality of elements that are individually identified with values ranging from A to B, both inclusive. For example, the VCSELs 11 to 17 include the VCSEL 11, the VCSEL 12, the VCSEL 13, the VCSEL 14, the VCSEL 15, the VCSEL 16, and the VCSEL 17 in this order.

As illustrated in FIG. 4B, the condenser lens 60 is disposed in the path of light emitted from each VCSEL (this path is also referred to as "light-emission path") so as to narrow the angle of divergence of light emitted from each VCSEL before the light enters the diffusion member 30. The diffusion member 30 is designed to have a predetermined function in response to incidence of parallel light. Each VCSEL emits light having an angle of divergence that is determined by the structure. Accordingly, even if light emitted from each VCSEL is caused to directly enter the diffusion member 30, it is difficult for the diffusion member 30 to achieve the designed function. Thus, the condenser lens 60 narrows the angle of divergence of light emitted from each VCSEL before the light enters the diffusion member 30. The angle of divergence is the full width at half maximum (FWHM) of light emitted from each VCSEL. The condenser lens 60 is an example of an optical element.

The condenser lens 60 is, for example, a plano-convex lens having a flat surface in the negative y direction, and has a length Cx in the x direction and a length Cy in the y direction. It is assumed here that the condenser lens 60 has a circular shape with the length Cx in the x direction being equal to the length Cy in the y direction (Cx=Cy). The circular shape includes, for example, an elliptical shape with the length Cx in the x direction being 0.95 times and 1.05 times the length Cy in the y direction. The major axis of the elliptical shape is not limited to the x direction or the y direction. The condenser lens 60 is an example of a lens and is not limited to a plano-convex lens.

The diffusion member 30 includes, for example, a resin layer having irregularities for diffusing light toward the back side (the −z direction) of a glass base material having opposing parallel flat surfaces. The diffusion member 30 is disposed in the light-emission path of the VCSELs from which light is emitted via the condenser lens 60, and expands the angle of divergence of incident light to emit light to the irradiation region 40. That is, the irregularities in the resin layer allow the diffusion member 30 to refract or scatter light to expand incident light to emit light to the irradiation region 40. The diffusion member 30 has a length Dx in the x direction and a length Dy in the y direction.

In place of the diffusion member 30, a diffractive member such as a diffractive optical element (DOE) for emitting light by making the direction of light different from the direction of incident light.

Although not illustrated in FIG. 4B, the VCSEL array 10 is disposed on a circuit substrate (not illustrated), and the condenser lens 60 and the diffusion member 30 are held at a predetermined distance away from the VCSEL array 10 by using a holding member (not illustrated) disposed on the circuit substrate.

As illustrated in FIG. 4A, the arrangement region 100 for the VCSELs is set to have an aspect ratio close to 1:1. The condenser lens 60 is disposed to include the arrangement region 100. This configuration allows efficient use of the area (or size) of the circular condenser lens 60. As described above, the VCSELs in each VCSEL group are arranged such that the number of VCSELs in the y direction is larger than the number of VCSELs in the x direction, and the VCSEL groups are arranged such that the number of VCSEL groups in the x direction is larger than the number of VCSEL groups in the y direction. Thus, the aspect ratio of the arrangement region 100 is close to 1:1.

FIGS. 5A and 5B illustrate the arrangement region 100 of the light emitting device 4 to which a first exemplary embodiment is applied and an arrangement region 100' of a light emitting device 4' for comparison to which the first exemplary embodiment is not applied. FIG. 5A illustrates the arrangement region 100 of the light emitting device 4 to which the first exemplary embodiment is applied, and FIG. 5B illustrates the arrangement region 100' of the light emitting device 4' to which the first exemplary embodiment is not applied. In FIGS. 5A and 5B, as in FIG. 3, the light emitting devices 4 and 4' are illustrated to be displaced from the irradiation region 40 in the vertical direction. In the light emitting devices 4 and 4', the diffusion member 30 is illustrated separately. Each of the light emitting devices 4 and 4' includes eight VCSEL groups (VCSEL groups #1 to #8).

The irradiation region 40 is the same for the light emitting device 4 to which the first exemplary embodiment is applied and the light emitting device 4' to which the first exemplary embodiment is not applied. That is, the irradiation region 40 has a shape whose longitudinal direction is the x direction, with the length Sx in the x direction being larger than the length Sy in the y direction.

In the light emitting device 4 to which the first exemplary embodiment is applied illustrated in FIG. 5A, the arrangement region 100 is disposed to have an aspect ratio (the ratio of the length Lx to the length Ly) close to 1:1. That is, the irradiation region 40 and the arrangement region 100 are not similar in shape. In this case, an arrangement region 110 corresponding to the VCSEL group #1 and an irradiation region 41 irradiated with light from the VCSEL group #1 are not similar in shape.

In the light emitting device 4' to which the first exemplary embodiment is not applied illustrated in FIG. 5B, in contrast, the arrangement region 100' and the irradiation region 40 are similar in shape. That is, when the arrangement region 100' has a length Lx' in the x direction and a length Ly' in the y direction, the length Lx' of the arrangement region 100' in the x direction is given by Sx/k, and the length Ly' of the arrangement region 100' in the y direction is given by Sy/k, where k denotes the proportionality coefficient. In this case, an arrangement region 110' corresponding to the VCSEL group #1 and the irradiation region 41 irradiated with light from the VCSEL group #1 are similar in shape. As illustrated in FIG. 5B, upper and lower portions of the circular condenser lens 60' are not utilized. If the area of the arrangement region 100' is equal to the area of the arrangement region 100, the condenser lens 60' to be used is larger than the condenser lens 60 of the light emitting device 4 to which the first exemplary embodiment is applied.

As described above, in the light emitting device 4 to which the first exemplary embodiment is applied, the area of the condenser lens 60 is more efficiently used than the area of the condenser lens 60' in the light emitting device 4' to which the first exemplary embodiment is not applied.

Equivalent Circuit of VCSEL Array 10

Figure 6:
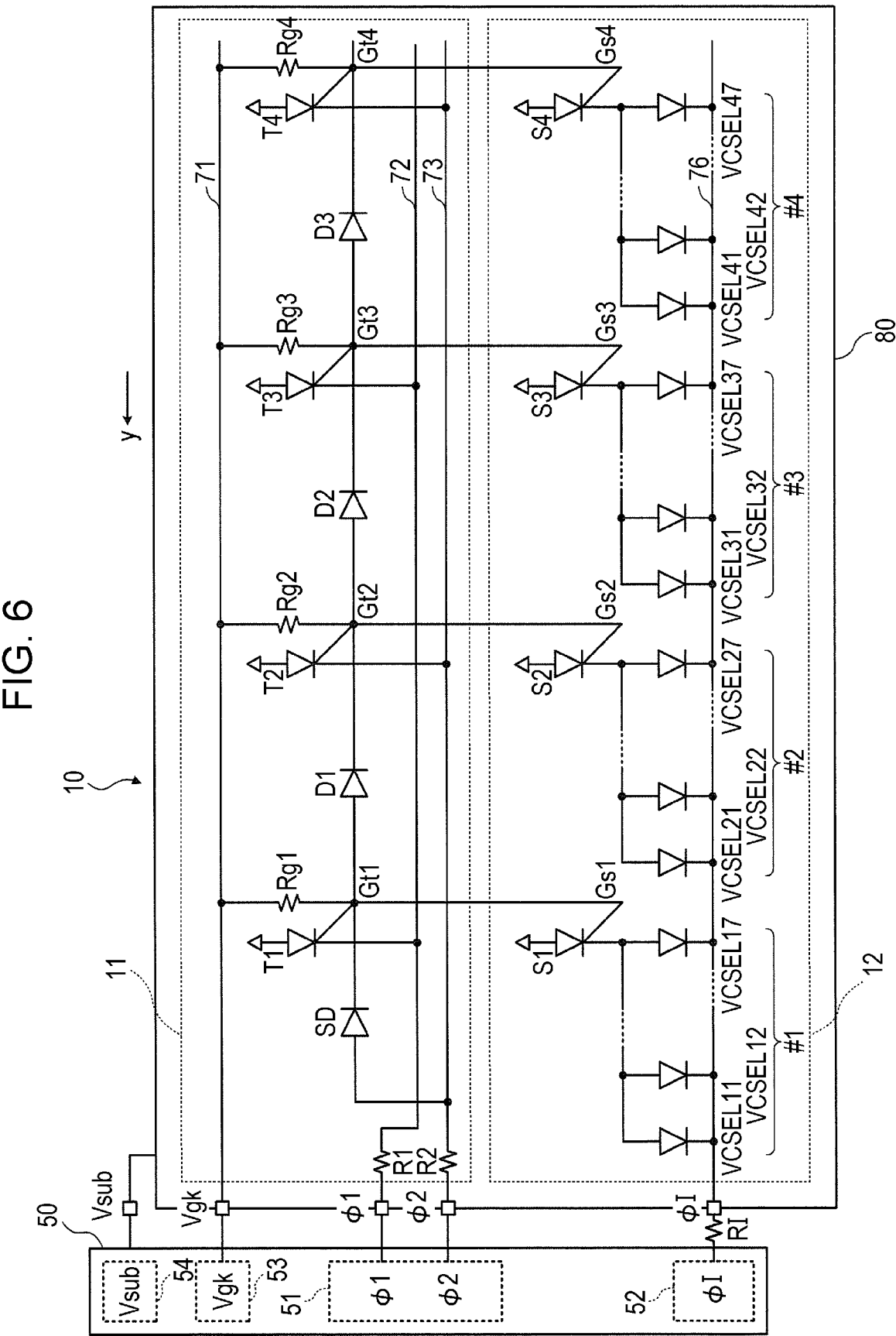
FIG. 6 illustrates an example equivalent circuit of a VERTICAL CAVITY SURFACE EMITTING LASER (VCSEL) array in the light emitting device to which the first exemplary embodiment is applied.

FIG. 6 illustrates an example equivalent circuit of the VCSEL array 10 in the light emitting device 4 to which the first exemplary embodiment is applied. A control unit 50 that controls the operation of the VCSEL array 10 is also illustrated. In FIG. 6, the leftward direction is defined as the y direction. The control unit 50 is disposed in the measurement control unit 8 illustrated in FIG. 2.

The VCSEL array 10 includes a plurality of VCSELs. In one example, as in FIG. 4A, each VCSEL group includes seven VCSELs. In FIG. 6, four VCSEL groups (VCSEL groups #1 to #4) are illustrated.

The VCSEL array 10 includes a setting thyristor S for each VCSEL group. Each VCSEL group and a corresponding one of the setting thyristors S are connected in series. Each of the setting thyristor S is also given "i" indicating the number of the corresponding VCSEL group. That is, the VCSEL group #1 includes the setting thyristor S1.

The VCSEL array 10 further includes a plurality of transfer thyristors T, a plurality of coupling diodes D, a plurality of power supply line resistors Rg, a start diode SD, and current-limiting resistors R1 and R2. The plurality of transfer thyristors T are each given "i" indicating the number of the corresponding VCSEL group, like the transfer thyristors T1, T2, and T3, when distinguished from one another. The same applies to the coupling diodes D and the power supply line resistors Rg. As described below, for example, the transfer thyristor T1 is disposed so as to correspond to the VCSEL group #1.

In FIG. 6, portions with i being 1 to 4 are illustrated. In the VCSEL array 10, "i" may be a predetermined number. For example, "i" may be 128, 512, 1024, or the like. The number of transfer thyristors T is desirably equal to the number of VCSEL groups. The number of transfer thyristors T may be larger than the number of VCSEL groups or may be smaller than the number of VCSEL groups.

The transfer thyristors T are arranged in the negative y direction in the order of the transfer thyristors T1, T2, T3, and so on. The coupling diodes D are arranged in the negative y direction in the order of the coupling diodes D1, D2, D3, and so on. The coupling diode D1 is disposed between the transfer thyristor T1 and the transfer thyristor T2. The same applies to the other coupling diodes D. The power supply line resistors Rg are also arranged in the negative y direction in the order of the power supply line resistors Rg1, Rg2, Rg3, and so on.

The VCSELs and the coupling diodes D are each a two-terminal device having an anode and a cathode. The setting thyristors S and the transfer thyristors T are each a three-terminal device having an anode, a cathode, and a gate. The gate of each of the transfer thyristors T is represented as a gate Gt, and the gate of each of the setting thyristors S is represented as a gate Gs. To distinguish the transfer thyristors T from one another and distinguish the setting thyristors S from one another, as described above, "i" is added to the reference symbols.

The VCSELs and the setting thyristors S constitute a light-emitting unit 12, and the transfer thyristors T, the coupling diodes D, the start diode SD, the power supply line resistors Rg, and the current-limiting resistors R1 and R2 constitute a drive unit 11.

Next, the connection relationship among the elements (the VCSELs, the setting thyristors S, the transfer thyristors T, and so on) will be described.

As described above, the VCSELs ij and the setting thyristor Si are connected in series. That is, the anode of the setting thyristor Si is connected to a reference potential Vsub (such as ground potential (GND)), and the cathode of the setting thyristor Si is connected in parallel to the anodes of the VCSELs ij.

The cathodes of the VCSELs ij are connected in common to a turn-on signal line 76 along which a turn-on signal ϕI is supplied to control the state of the VCSELs ij to a light-emitting state or a non-light-emitting state.

As described below, the reference potential Vsub is supplied via a back electrode 90 (see FIGS. 7 and 8 described below) disposed on the back side of a substrate 80 constituting the VCSEL array 10.

The anodes of the transfer thyristors T are connected to the reference potential Vsub. The cathodes of the odd-numbered transfer thyristors T1, T3, and so on are connected to a transfer signal line 72. The transfer signal line 72 is connected to a ϕ1 terminal via the current-limiting resistor R1.

The cathodes of the even-numbered transfer thyristors T2, T4, and so on are connected to a transfer signal line 73. The transfer signal line 73 is connected to a ϕ2 terminal via the current-limiting resistor R2.

The coupling diodes D are connected in series with each other. That is, the cathode of one of the coupling diodes D is connected to the anode of the coupling diode D adjacent thereto in the negative y direction. The anode of the start diode SD is connected to the transfer signal line 73, and the cathode of the start diode SD is connected to the anode of the coupling diode D1.

The cathode of the start diode SD and the anode of the coupling diode D1 are connected to the gate Gt1 of the transfer thyristor T1. The cathode of the coupling diode D1 and the anode of the coupling diode D2 are connected to the gate Gt2 of the transfer thyristor T2. The same applies to the other coupling diodes D.

The gates Gt of the transfer thyristors T are connected to a power supply line 71 via the power supply line resistors Rg. The power supply line 71 is connected to a Vgk terminal.

The gate Gti of the transfer thyristor Ti is connected to the gate Gsi of the setting thyristor Si.

The configuration of the control unit 50 will be described.

The control unit 50 generates a signal such as the turn-on signal ϕ1 and supplies the signal to the VCSEL array 10. The VCSEL array 10 operates in accordance with the supplied signal. The control unit 50 is constituted by an electronic circuit. For example, the control unit 50 may be an integrated circuit (IC) configured to control the operation of the VCSEL array 10.

The control unit 50 includes a transfer signal generation unit 51, a turn-on signal generation unit 52, a power supply potential generation unit 53, and a reference potential generation unit 54.

The transfer signal generation unit 51 generates transfer signals ϕ1 and ϕ2 and supplies the transfer signal ϕ1 to the ϕ1 terminal of the VCSEL array 10 and the transfer signal ϕ2 to the ϕ2 terminal of the VCSEL array 10.

The turn-on signal generation unit 52 generates the turn-on signal ϕI and supplies the turn-on signal ϕI to a ϕI terminal of the VCSEL array 10 via a current-limiting resistor RI. The current-limiting resistor RI may be disposed in the VCSEL array 10. If the current-limiting resistor RI is not required for the operation of the VCSEL array 10, the current-limiting resistor RI may not be provided.

The power supply potential generation unit 53 generates a power supply potential Vgk and supplies the power supply potential Vgk to the Vgk terminal of the VCSEL array 10. The reference potential generation unit 54 generates the reference potential Vsub and supplies the reference potential Vsub to a Vsub terminal of the VCSEL array 10. In one example, the power supply potential Vgk is −3.3 V. As described above, in one example, the reference potential Vsub is ground potential (GND).

The transfer signals ϕ1 and ϕ2 generated by the transfer signal generation unit 51 and the turn-on signal ϕI generated by the turn-on signal generation unit 52 will be described below.

In the VCSEL array 10 illustrated in FIG. 6, each transfer thyristor T1 is connected to a VCSEL group having seven VCSELs ij (j=1 to 7) via the setting thyristor Si.

As described below, the transfer thyristor T1 is turned on, thereby setting the setting thyristor Si connected to the common transfer thyristor T1 to be capable of transitioning to an on state. The setting thyristors S set the VCSELs to the state of being capable of emitting light and are named accordingly. When the setting thyristor Si is turned on, the VCSELs ij emit light. The transfer thyristors Ti are driven to transfer the on state in the order of "i". That is, the on state is sequentially propagated across the transfer thyristors Ti. Accordingly, the transfer thyristors Ti sequentially turn on the VCSEL groups. The transfer thyristors T is an example of light-emission instruction units.

In the illustrated example, each VCSEL group is constituted by a plurality of VCSELs. A VCSEL group is connected to each transfer thyristor T, and the plurality of VCSELs included in the VCSEL group emit light in parallel.

In the example illustrated in FIG. 6, the VCSEL groups include the same number of (seven in the illustrated example) VCSELs. Alternatively, each VCSEL group may include a different number of VCSELs.

It is desirable that each VCSEL oscillate in a low-order single transverse mode (single mode). In the single mode, the intensity profile of light (emitted light) emitted from a light-emitting point (a light-emitting port 310 illustrated in FIG. 8 described below) of each VCSEL shows a single peak (a characteristic having a single intensity peak). In a VCSEL that oscillates in multiple transverse modes (multimode) including higher orders, in contrast, the intensity profile is likely to be distorted, such as showing a plurality of peaks. In the single mode, the angle of divergence of light (emitted light) emitted from the light-emitting point is smaller than that in the multimode.

The VCSEL is more likely to oscillate in a single transverse mode (single mode) when the area of the light-emitting point is smaller. Accordingly, a single-mode VCSEL has a small optical output. An increase in the area of the light-emitting point to increase the optical output makes it easy to cause a transition to the multimode. To address this, each VCSEL group is constituted by a plurality of VCSELs, and the plurality of VCSELs included in the VCSEL group are caused to emit light in parallel, thereby increasing the optical output.

Planar Layout of VCSEL Array 10

Figure 7:
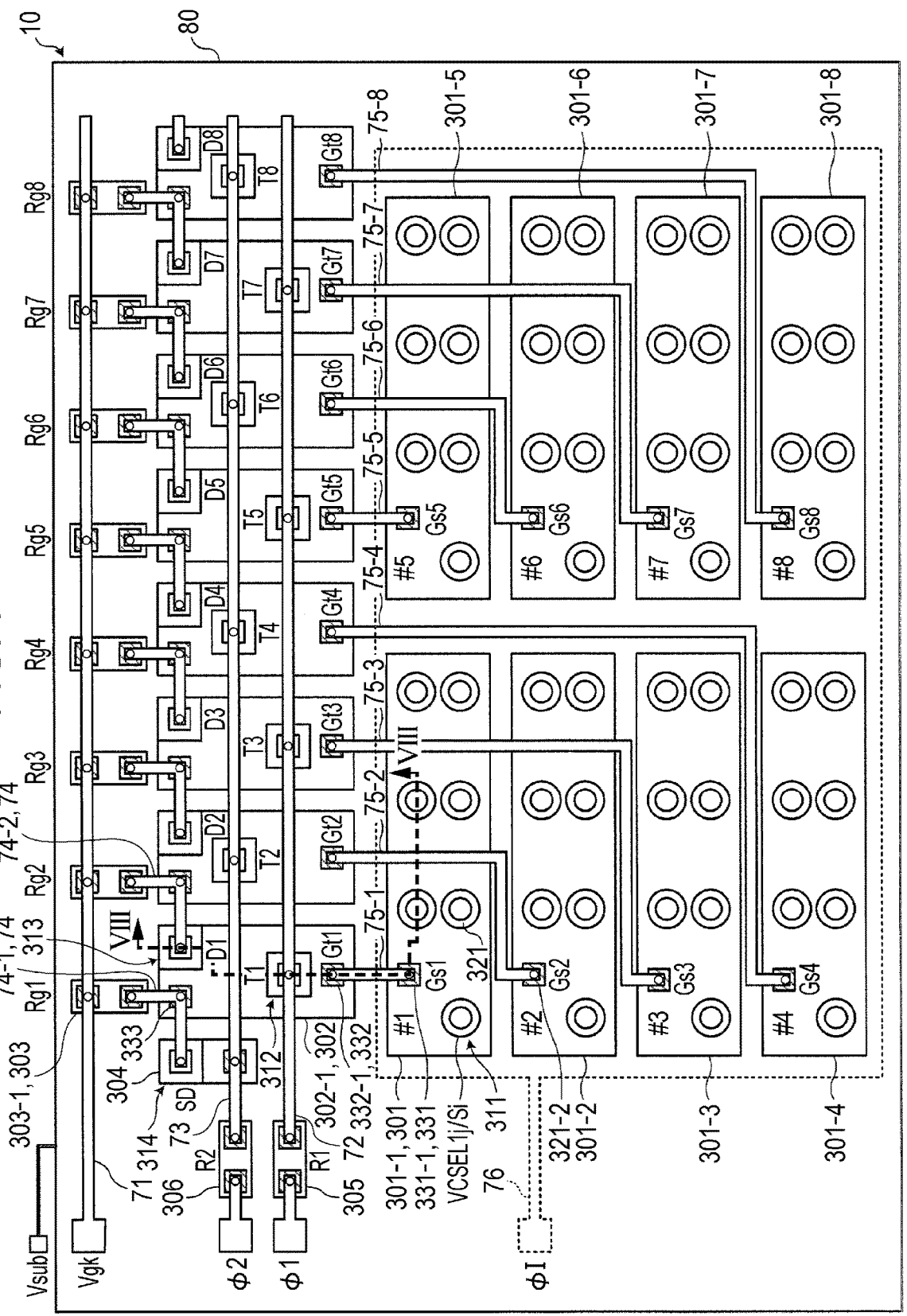
FIG. 7 illustrates an example planar layout of the VCSEL array to which the first exemplary embodiment is applied.

FIG. 7 illustrates an example planar layout of the VCSEL array 10 to which the first exemplary embodiment is applied. In FIG. 7, the upward direction is defined as the x direction, and the leftward direction is defined as the y direction.

The VCSEL array 10 is composed of a semiconductor material capable of emitting laser light. For example, the VCSEL array 10 is composed of a GaAs-based compound semiconductor. As illustrated in a cross-sectional view described below (FIG. 8 described below), the VCSEL array 10 is configured such that a semiconductor layer stack formed by stacking a plurality of GaAs-based compound semiconductor layers on top of a p-type GaAs substrate 80 is separated into a plurality of islands. A region left in an island shape is referred to as an island. Etching a semiconductor layer stack into islands to separate elements is referred to as mesa etching. The planar layout of the VCSEL array 10 will now be described using islands 301 to 306 illustrated in FIG. 7. The islands 301, 302, and 303 are disposed for each VCSEL group. The islands 301, 302, and 303 are given "i" in a manner similar to that described above and are sometimes represented by the islands 301-i, 302-i, and 303-i when distinguished from one another for each VCSEL group. In FIG. 7, portions with i being 1 to 8 are illustrated. The number of VCSELs in each VCSEL group is denoted by "j", as described above. Here, j is 1 to 7. In this manner, the VCSEL array 10 is formed on a common semiconductor substrate. Accordingly, the light emitting device 4 is reduced in size.

Figure 8:
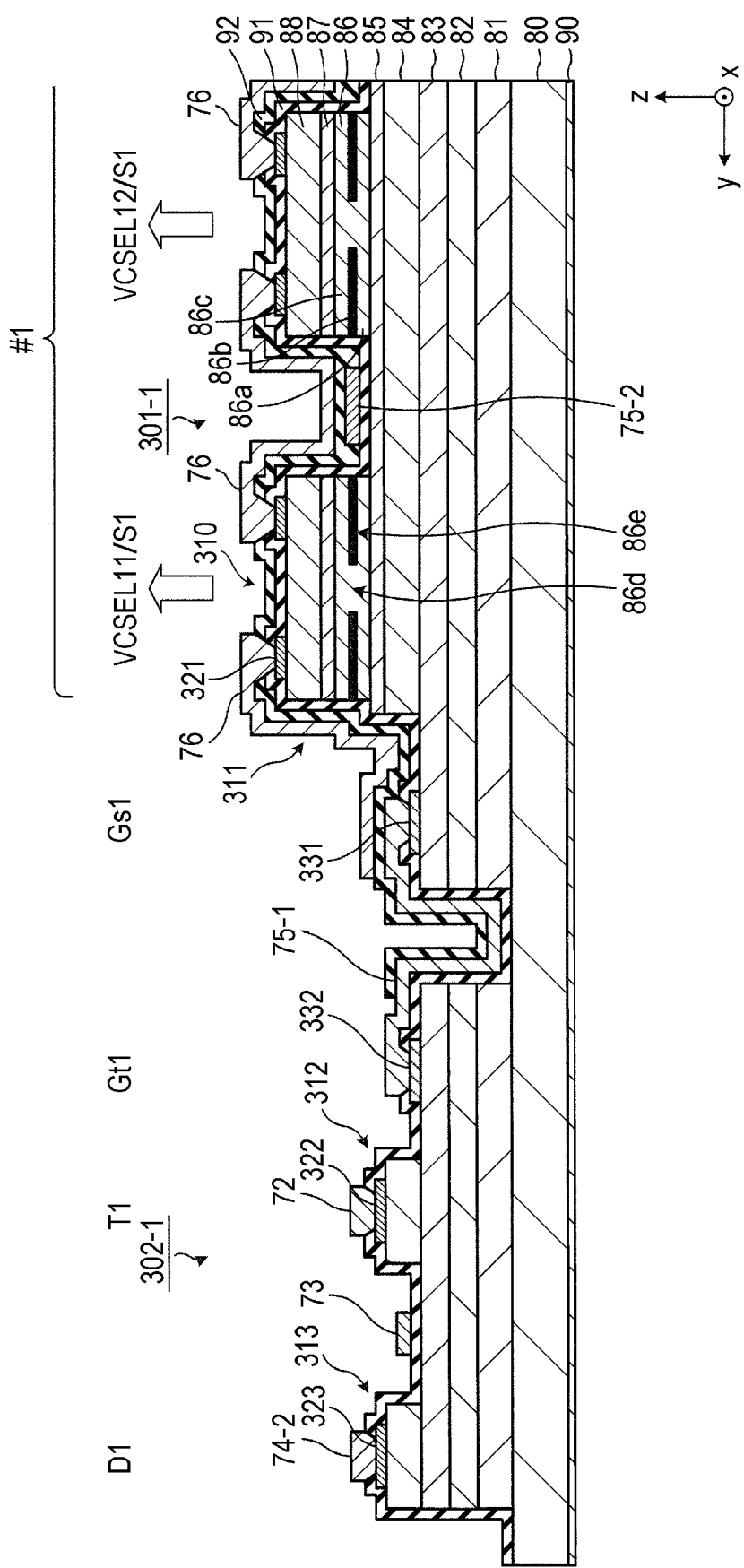
FIG. 8 illustrates a cross-sectional structure of the VCSEL array.

The island 301-i is provided with the VCSELs ij and the setting thyristor Si. As illustrated in FIG. 8 described below, each VCSEL ij and the setting thyristor Si are stacked on each other. In FIG. 7, each VCSEL ij and the setting thyristor Si are represented by a VCSEL ij/Si. The VCSEL ij, where "i" is 1, for example, is represented by VCSEL 1j/S1. The islands 301-i with i being 1 to 4 are arranged in parallel in the negative x direction, and the islands 301-i with i being 5 to 8 are arranged in parallel in the negative x direction. The islands 301-i with i being 1 to 4 and the island 301-i with i being 5 to 8 are arranged in parallel in the negative y direction.

The island 301-i includes seven VCSELs, as indicated by the VCSEL group #1 illustrated in FIG. 4A. No reference numerals are given to the VCSELs.

The islands 302-i are provided with the transfer thyristors Ti and the coupling diodes Di. The islands 302-i are disposed in parallel in the negative y direction.

The islands 303-i are provided with power supply line resistors Rgi. The islands 303-i are disposed in parallel in the negative y direction.

The island 304 is provided with the start diode SD. The island 305 is provided with the current-limiting resistor R1, and the island 306 is provided with the current-limiting resistor R2.

Cross-Sectional Structure of VCSEL Array 10

Prior to the description of the connection relationship among the islands 301 to 306, the cross-sectional structure of the islands 301 and 302 will be described.

FIG. 8 illustrates the cross-sectional structure of the VCSEL array 10. FIG. 8 is a cross-sectional view of the VCSEL array 10 taken along line VIII-VIII in FIG. 7. That is, the cross-sectional view illustrated in FIG. 8 is a cross-sectional view crossing the coupling diode D1, the transfer thyristor T1, the VCSEL 11/S1, and the VCSEL 12/S1 from left to right in FIG. 8. That is, portions of the island 301-1 and the island 302-1 are illustrated.

First, the island 301-1 including the setting thyristor S and the VCSELs will be described. Here, the setting thyristor S and the VCSELs are stacked on each other (the VCSEL 11/S1 and the VCSEL 12/S1). As illustrated in FIG. 8, the p-type GaAs substrate 80 is overlaid with layers constituting the setting thyristor S1, namely, a p-type anode layer (hereinafter referred to as "p-anode layer") 81, an n-type gate layer (hereinafter referred to as "n-gate layer") 82, a p-type gate layer (hereinafter referred to as "p-gate layer") 83, and an n-type cathode layer (hereinafter referred to as "n-cathode layer") 84. That is, each of the setting thyristors S is configured such that the p-anode layer 81 serves as an anode, the n-gate layer 82 serves as an n-gate, the p-gate layer 83 serves as a p-gate, and the n-cathode layer 84 serves as a cathode.

The n-cathode layer 84 is overlaid with a tunnel junction layer 85.

The tunnel junction layer 85 is overlaid with layers constituting the VCSEL 11 and the VCSEL 12, namely, a p-type anode layer (hereinafter referred to as "p-anode layer") 86, a light-emitting layer 87, and an n-type cathode layer (hereinafter referred to as "n-cathode layer") 88. That is, each VCSEL is configured such that the p-anode layer 86 serves as an anode, the light-emitting layer 87 serves as a light-emitting layer, and the n-cathode layer 88 serves as a cathode.

The setting thyristor S1 is connected in series with the VCSEL 11 and the VCSEL 12 via the tunnel junction layer 85. The tunnel junction layer 85 will be described below.

In a portion corresponding to the VCSEL 11 and the VCSEL 12, the n-cathode layer 88, the light-emitting layer 87, and the p-anode layer 86 are removed by etching so as to expose the tunnel junction layer 85 around the VCSELs. In the illustrated example, each VCSEL has a circular cross section. That is, portions corresponding to the VCSELs are formed into columnar shapes. The portions corresponding to the VCSELs are referred to as posts 311 (see FIG. 7).

The p-anode layer 81, the n-gate layer 82, the p-gate layer 83, and the n-cathode layer 84 of the setting thyristor S and the tunnel junction layer 85 are continuous across the VCSELs belonging to the VCSEL group #1 (i.e., the VCSELs 11 to 17).

In the island 301-1, a portion where the tunnel junction layer 85 and the n-cathode layer 84 are removed to expose the p-gate layer 83 is provided with, as the gate Gs1 of the setting thyristor S1, a p-ohmic electrode 331 composed of a metal material that easily forms an ohmic contact with a p-type semiconductor layer such as the p-gate layer 83.

The n-cathode layer 88 of each VCSEL has formed thereon an n-ohmic electrode 321 composed of a metal material that easily forms an ohmic contact with an n-type semiconductor layer such as the n-cathode layer 88. The n-ohmic electrode 321 is formed in a circular shape (see FIG. 7) so as to surround the light emitting port 310.

The p-anode layer 86 of the post 311 includes a current confinement layer 86*b*. In one example, the p-anode layer 86 includes three layers, namely, a lower p-anode layer 86*a*, the current confinement layer 86*b*, and an upper p-anode layer 86*c*. The current confinement layer 86*b* is a layer composed of a material having a high Al composition ratio, such as AlAs, and includes a portion (black portion in FIG. 8) where oxidation of Al to $Al_2O_3$ causes an increase in electrical resistance to impede current flow.

Since the post 311 is formed into a columnar shape, if the current confinement layer 86*b* is oxidized from an exposed side surface of the p-anode layer 86, oxidation proceeds from the peripheral part to the center part of the circular cross section. The center part is not oxidized to form a current passing region 86*d* where current flow is facilitated in the center part of the cross section of the VCSEL and a current blocking region 86*e* where current flow is impeded in the peripheral part. In the VCSEL, light is emitted from a portion of the light-emitting layer 87 where a current path is limited by the current passing region 86*d*. A region on the surface of the VCSEL corresponding to the current passing region 86*d* is a light-emitting point and is the light emitting port 310.

The current confinement layer 86*b* is provided to cause the VCSEL to oscillate in a low-order single transverse mode (single mode). That is, the cross-sectional shape of the post 311 in which the VCSEL is to be formed is formed into a circular shape, and oxidation is performed from the peripheral part, thereby forming the cross-sectional shape of the light emitting port 310 into a circular shape and reducing the area of the light emitting port 310.

Further, the peripheral part of the VCSEL has many defects caused by mesa etching, and non-radiative recombination is likely to occur. Accordingly, the current blocking region 86*e* is disposed to reduce the power to be consumed in the non-radiative recombination. This reduces power consumption and improves light extraction efficiency. The light extraction efficiency is the amount of light that can be extracted per unit power.

Next, the island 302-1 including the transfer thyristor T1 and the coupling diode D1 will be described. Like the setting thyristors S, the transfer thyristor T1 includes the p-anode layer 81, the n-gate layer 82, the p-gate layer 83, and the n-cathode layer 84. That is, the transfer thyristor T1 is configured such that the p-anode layer 81 serves as an anode, the n-gate layer 82 serves as an n-gate, the p-gate layer 83 serves as a p-gate, and the n-cathode layer 84 serves as a cathode. In the illustrated example, a gate electrode (p-ohmic electrode 332 described below) is disposed on top of the p-gate layer 83.

The coupling diode D1 includes the p-gate layer 83 and the n-cathode layer 84. That is, the coupling diode D1 is configured such that the p-gate layer 83 serves as an anode and the n-cathode layer 84 serves as a cathode.

In the island 302-1, the n-cathode layer 88, the light-emitting layer 87, the p-anode layer 86, and the tunnel junction layer 85 in portions where the setting thyristor S and the VCSELs are stacked on each other are removed. Further, the n-cathode layer 84 is removed in the portion corresponding to the transfer thyristor T1 and the portion corresponding to the coupling diode D1 so that the n-cathode layer 84 is left as a post 312 and a post 313.

The n-cathode layer 84 of the post 312 has formed thereon an n-ohmic electrode 322 as a cathode electrode of the transfer thyristor T1. Likewise, the n-cathode layer 84 of the post 313 has formed thereon an n-ohmic electrode 323 as a cathode electrode of the coupling diode D1.

The p-ohmic electrode 332 formed on the p-gate layer 83 functions as the gate Gt1 of the transfer thyristor T1 and an anode electrode of the coupling diode D1.

An interlayer insulating layer 91 is formed so as to cover the surface. The interlayer insulating layer 91 has formed thereon a wiring line 75-1 that connects the p-ohmic electrode 331 (the gate Gs1) formed in the island 301-1 and the p-ohmic electrode 332 (the gate Gt1) formed in the island 302-1 via a through hole, and a wiring line 75-2 that connects the p-ohmic electrode (the gate Gs2) formed in the island 301-2 and the p-ohmic electrode (the gate Gt2) formed in the island 302-2 via a through hole. The interlayer insulating layer 91 further has formed thereon the transfer signal line 72 connected to the n-ohmic electrode 322. The interlayer insulating layer 91 further has formed thereon the transfer signal line 73. The interlayer insulating layer 91 also has formed thereon a wiring line 74-2 connected to the n-ohmic electrode 323 via a through hole.

An interlayer insulating layer 92 is further formed so as to cover the surface. The interlayer insulating layer 92 has formed thereon a turn-on signal line 76 connected to the n-ohmic electrode 321 formed in the island 301-1 via a through hole formed in the interlayer insulating layer 92 and the interlayer insulating layer 91. That is, the wiring lines 75 (the wiring lines 75-1 and 75-2) and the turn-on signal line 76 have a multilayer wiring structure with the interlayer insulating layer 92 interposed therebetween. The wiring lines 75 are wiring lines that connect the VCSEL groups, which are an example of light-emitting element group rows, to the transfer thyristors T, which are an example of light-emission instruction units, to provide a light-emission instruction from the light-emission instruction units to the light-emitting element groups.

If the interlayer insulating layers 91 and 92 have poor transparency to the light emitted from the VCSEL, a light-emitting layer having excellent transparency to the light emitted from VCSEL may be disposed in place of the interlayer insulating layers 91 and 92 on the light emitting port 310.

The islands 301, 302, 303, 304, 305, and 306 are separated from one another by removing the surrounding semiconductor layer stack down to the substrate 80 by using etching. Etching may be performed down to the p-anode layer 81, or may be performed down to a portion of the p-anode layer 81 in the thickness direction.

Referring back to FIG. 7, the other islands 303, 304, 305, and 306 will be described. The island 303 includes the power supply line resistor Rg1. In the island 303-1, the n-cathode layer 88, the light-emitting layer 87, the p-anode layer 86, the tunnel junction layer 85, and the n-cathode layer 84 in the semiconductor layer stack are removed to expose the p-gate layer 83. The exposed p-gate layer 83 has formed thereon a pair of p-ohmic electrodes. The p-gate layer 83 between the p-ohmic electrodes is used as a resistor.

The island 304 is provided with the start diode SD. In the island 304, the n-cathode layer 88, the light-emitting layer 87, the p-anode layer 86, and the tunnel junction layer 85 in the semiconductor layer stack are removed. The p-gate layer 83 is exposed, except for a post 314 in which the n-cathode layer 84 is left. In the start diode SD, the n-cathode layer 84 forming the post 314 serves as a cathode, and the p-gate layer 83 serves as an anode. An n-ohmic electrode formed on the n-cathode layer 84 of the post 314 is a cathode electrode, and a p-ohmic electrode formed on the exposed p-gate layer 83 is an anode electrode.

The island 305 is provided with the current-limiting resistor R1, and the island 306 is provided with the current-limiting resistor R2. The islands 305 and 306 have configurations similar to that of the island 303 in which the p-gate layer 83 between a pair of p-ohmic electrodes formed on the exposed p-gate layer 83 is used as the current-limiting resistor R1 and the p-gate layer 83 between a pair of p-ohmic electrodes formed on the exposed p-gate layer 83 is used as the current-limiting resistor R2.

The islands 301 to 306 and the connection relationship among the islands will be described.

As described above, the n-cathode layer 88, which serves as the cathode of the VCSEL formed in the post 311 of the island 301-1, is connected in parallel to the turn-on signal line 76 via the n-ohmic electrode 321. The same applies to the remaining island 301.

The n-cathode layer 88, which serves as the cathode of the transfer thyristor T1 formed in the post 312 of the island 302-1, is connected to the transfer signal line 72 via the n-ohmic electrode 322. The same applies to the transfer thyristor T3 formed in the island 302-3 (the island 302 located in the third place toward the negative y direction side). That is, the cathodes (the n-cathode layer 88) of the transfer thyristors Ti with the odd numbers i are connected to the transfer signal line 72.

On the other hand, the cathode (the n-cathode layer 88) of the transfer thyristor T2 formed in the island 302-2 (the island 302 located in the second place toward the negative y direction side) is connected to the transfer signal line 73. That is, the cathodes (the n-cathode layer 88) of the transfer thyristors Ti with the even numbers i are connected to the transfer signal line 73.

The p-ohmic electrode 331, which is the gate Gs1 of the island 301-1, and the p-ohmic electrode 332, which is the gate Gt1 of the island 301-2, are connected to each other via the wiring line 75-1. The cathode (the n-cathode layer 88) of the coupling diode D1 formed in the post 313 of the island 302-1 is connected to the wiring line 74-2 via the n-ohmic electrode 323 (see FIG. 8). The wiring line 74-2 is connected to a p-ohmic electrode (assigned no reference numeral) of the island 302-2 and a p-ohmic electrode (assigned no reference numeral) of the power supply line resistor Rg2 of the island 303-2, which are adjacent to each other.

A p-ohmic electrode 333 formed in the island 302-1 (formed on the p-gate layer 83 in a manner similar to that for the p-ohmic electrode 332 corresponding to the gate Gt1), one p-ohmic electrode of the power supply line resistor Rg1 formed in the island 303-1, and an n-ohmic electrode that is a cathode electrode of the start diode SD formed in the island 304 are connected to one another via a wiring line 74-1.

The other p-ohmic electrode of the power supply line resistor Rg1 in the island 303-1 is connected to the power supply line 71. The power supply line 71 is connected to the Vgk terminal. The same applies to the remaining island 303.

The transfer signal line 72 is connected to one p-ohmic electrode (assigned no reference numeral) of the current-limiting resistor R1 in the island 305. The other p-ohmic electrode (assigned no reference numeral) of the current-limiting resistor R1 is connected to the φ1 terminal. The transfer signal line 73 is connected to the p-ohmic electrode of the start diode SD in the island 303 and is also connected to one p-ohmic electrode (assigned no reference numeral) of the current-limiting resistor R2 in the island 306. The other p-ohmic electrode (assigned no reference numeral) of the current-limiting resistor R2 in the island 306 is connected to the φ2 terminal.

While the islands 301-1, 302-1, and 303-1 have been described as examples, the same applies to the other islands 301, 302, and 303. In FIG. 7, the wiring line 74-1 or the like is illustrated as "wiring line 74-1, 74" to indicate that the same applies to the other wiring lines 74.

Thyristors

Next, the operation of the setting thyristors S and the transfer thyristors T will be described. The setting thyristor S and the transfer thyristors T are collectively referred to as a thyristor.

The thyristor is configured such that the p-anode layer 81, the n-gate layer 82, the p-gate layer 83, and the n-cathode layer 84 are stacked on one another.

As described above, the thyristor is a semiconductor element having three terminals, namely, an anode, a cathode, and a gate, and is configured such that, for example, p-type semiconductor layers (the p-anode layer 81 and the p-gate layer 83) and n-type semiconductor layers (the n-gate layer 82 and the n-cathode layer 84) made of GaAs, GaAlAs, AlAs, or the like are stacked on each other. That is, the thyristor has a pnpn structure. In one example, a forward potential (diffusion potential) Vd of a pn junction formed of a p-type semiconductor layer and an n-type semiconductor layer is set to 1.5 V.

In one example, the reference potential Vsub of the p-anode layer 81 is set to 0 V as a high-level potential (hereinafter referred to as "H"), and the power supply potential Vgk to be supplied to the Vgk terminal (see FIG. 6) is set to −3.3 V as a low-level potential (hereinafter referred to as "L"). Accordingly, the potentials are sometimes represented by "H (0 V)" and "L (−3.3 V)". As illustrated in FIG. 6, the Vgk terminal is connected to the gate (the gate Gt1 when the thyristor is the transfer thyristor T1) via the power supply line resistor Rg1.

The thyristor in an off state in which no current flows between the anode and the cathode transitions to an on state (turned on) when a potential lower (negative potential whose absolute value is larger) than a threshold voltage is applied to the cathode. The threshold voltage of the thyristor is a value obtained by subtracting the forward potential Vd (1.5 V) of the pn junction from the potential of the gate.

In the on state, the gate of the thyristor has a potential close to the potential of the anode. Since the anode has a potential of 0 V, the gate is set to have a potential of 0 V. The cathode of the thyristor in the on state has a potential (the absolute value is referred to as a holding voltage) close to a potential obtained by subtracting the forward potential Vd (1.5 V) of the pn junction from the potential of the anode. Since the anode has a potential of 0 V, the cathode of the thyristor in the on state has a potential close to −1.5 V (negative potential whose absolute value is larger than 1.5 V). The holding voltage is set to 1.5 V.

The thyristor in the on state maintains the on state when a potential lower (negative potential whose absolute value is larger) than a potential necessary to maintain the on state is continuously applied to the cathode and a current (maintenance current) that allows the on state to be maintained is supplied.

On the other hand, the thyristor in the on state transitions to the off state (turned off) when the potential of the cathode becomes a potential (negative potential whose absolute value is small, 0 V, or positive potential) higher than a potential necessary to maintain the on state (potential close to −1.5 V described above).

Tunnel Junction Layer 85

As illustrated in FIG. 8, in the island 301, the setting thyristor S and each VCSEL are stacked on each other with the tunnel junction layer 85 interposed therebetween. Accordingly, the setting thyristor S and each VCSEL are connected in series.

Figure 9A:
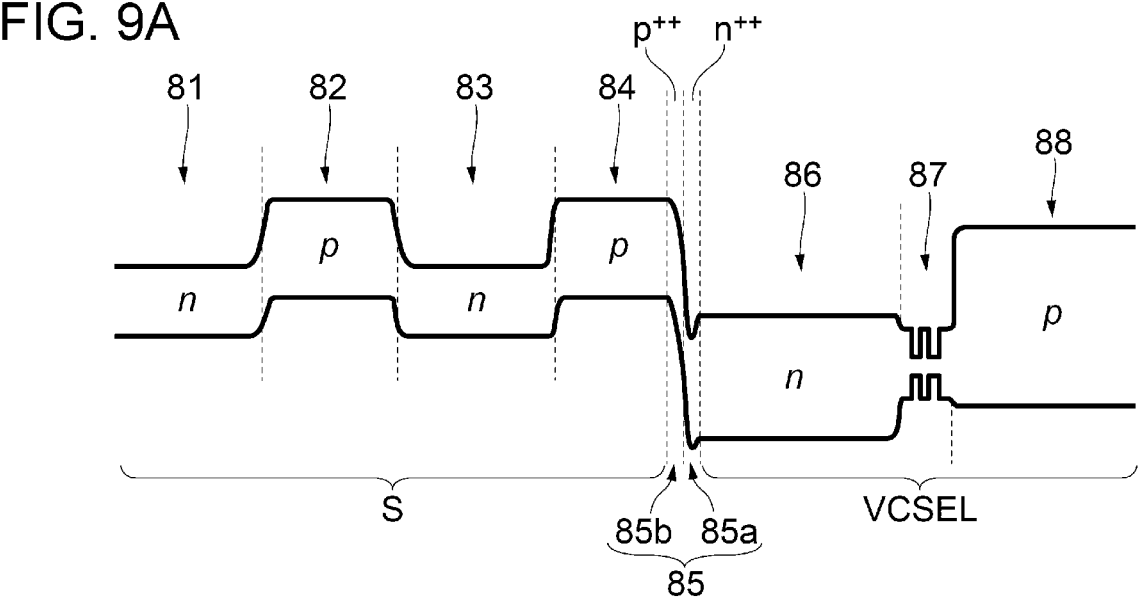
FIG. 9A is a schematic energy band diagram of a layered structure of a setting thyristor and a VCSEL.
Figure 9B:
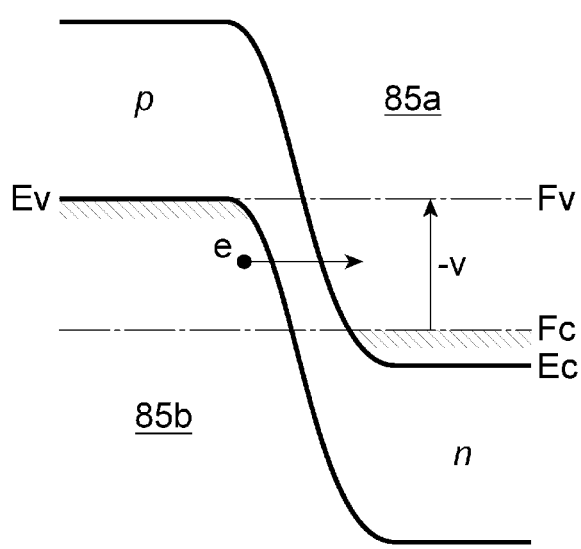
FIG. 9B is an energy band diagram of a tunnel junction layer in a reverse bias state.
Figure 9C:
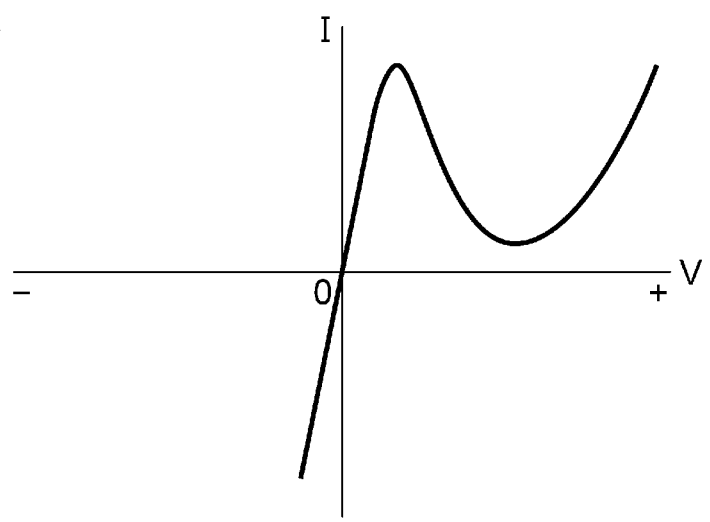
FIG. 9C illustrates a current-voltage characteristic of the tunnel junction layer.

FIGS. 9A to 9C further illustrate the layered structure of the setting thyristor S and each VCSEL. FIG. 9A is a schematic energy band diagram of the layered structure of the setting thyristor S and each VCSEL, FIG. 9B is an energy band diagram of the tunnel junction layer 85 in a reverse bias state, and FIG. 9C illustrates a current-voltage characteristic of the tunnel junction layer 85.

A voltage is applied between the turn-on signal ϕI to be applied to the n-ohmic electrode 321 illustrated in FIGS. 7 and 8 and the reference potential Vsub of the back electrode 90 so that the setting thyristor S and each VCSEL are forward biased. Then, as illustrated in the energy band diagram in FIG. 9A, a reverse bias occurs between an n$^{++}$ layer 85a and a p$^{++}$ layer 85b constituting the tunnel junction layer 85.

The tunnel junction layer 85 is a junction between the n$^{++}$ layer 85a doped with an n-type impurity at a high concentration and the p$^{++}$ layer 85b doped with a p-type impurity at a high concentration. Thus, if the depletion region is narrow in width and is forward biased, electrons tunnel from the conduction band on the n$^{++}$ layer 85a side to the valence band on the p$^{++}$ layer 85b side. At this time, a negative resistance characteristic appears (see the forward bias side (+V) in FIG. 9C).

On the other hand, as illustrated in FIG. 9B, when the tunnel junction layer 85 is reverse biased (−V), a potential Ev of the valence band on the p$^{++}$ layer 85b side becomes higher than a potential Ec of the conduction band on the n$^{++}$ layer 85a side. Then, electrons tunnel from the valence band of the p$^{++}$ layer 85b to the conduction band on the n$^{++}$ layer 85a side. As the reverse bias voltage (−V) increases, electrons more easily tunnel. That is, as illustrated in the reverse bias side (−V) in FIG. 9C, the larger the reverse bias, the more easily current flows through the tunnel junction layer 85 (tunnel junction).

Thus, as illustrated in FIG. 9A, when a voltage is applied so that the setting thyristor S and the VCSEL are forward biased and the setting thyristor S is turned on and transitions to the on state, current flows from the setting thyristor S to the VCSEL even if the tunnel junction layer 85 is reverse biased.

In place of the tunnel junction layer 85, a group III-V compound layer having metallic conductivity and epitaxially grown on a group III-V compound semiconductor layer may be used. InNAs, which is described as an example of the material of a metallically conductive group III-V compound layer, has a negative band gap energy when, for example, the composition ratio x of InN is in the range of about 0.1 to about 0.8. InNSb has a negative band gap energy when, for example, the composition ratio x of InN is in the range of about 0.2 to about 0.75. Having a negative band gap energy means having no band gap. Accordingly, conductive characteristics similar to those of metal are shown. That is, the metallic conductive characteristic (conductivity) means that current flows when there is a potential gradient as in the case of metal.

A group III-V compound (semiconductor) such as GaAs or InP has a lattice constant in the range of 5.6 Å to 5.9 Å. The lattice constant is close to the lattice constant of Si, which is about 5.43 Å, and the lattice constant of Ge, which is about 5.66 Å.

In contrast, the lattice constant of InN, which is also a group III-V compound, is about 5.0 Å in the zincblende structure, and the lattice constant of InAs is about 6.06 Å. Thus, the lattice constant of InNAs, which is a compound of InN and InAs, may be a value close to 5.6 Å to 5.9 Å of GaAs or the like.

The lattice constant of InSb, which is a group III-V compound, is about 6.48 Å. Since the lattice constant of InN is about 5.0 Å, the lattice constant of InNSb, which is a compound of InSb and InN, may be a value close to 5.6 Å to 5.9 Å of GaAs or the like.

That is, InNAs and InNSb may be monolithically epitaxially grown on a layer of a group III-V compound (semiconductor) such as GaAs. Further, a layer of a group III-V compound (semiconductor) such as GaAs may be monolithically stacked by epitaxial growth on a layer of InNAs or InNSb.

Accordingly, the setting thyristor S and the VCSEL are stacked on each other so as to be connected in series with a metallically conductive group III-V compound layer instead of the tunnel junction layer 85 interposed therebetween, thereby preventing the n-cathode layer 84 of the setting thyristor S and the p-anode layer 86 of the VCSEL from being reverse biased.

Operation of Stacked Setting Thyristor S and VCSEL

Next, the operation of the setting thyristor S and the VCSEL that are stacked on each other will be described.

The VCSEL has a rising voltage of 1.5 V. That is, the VCSEL emits light when a voltage greater than or equal to 1.5 V is applied between the anode and the cathode of the VCSEL.

The turn-on signal ϕI is set to 0 V ("H (0 V)") or −3.3 V ("L (−3.3 V)"). A potential of 0 V is a potential for bringing the VCSEL into the off state, and a potential of −3.3 V is a potential for changing the VCSEL from the off state to the on state.

When the VCSEL is caused to transition from the off state to the on state, the turn-on signal ϕI is set to "L (−3.3 V)". At this time, a voltage of −1.5 V is applied to the gate Gs of the setting thyristor S, the threshold value of the setting thyristor S becomes −3 V, which is obtained by subtracting the forward potential Vd (1.5 V) of the pn junction from the potential (−1.5 V) of the gate Gs. At this time, since the turn-on signal ϕI is set to −3.3 V, the setting thyristor S is turned on and transitions from the off state to the on state, and the VCSEL also transitions from the off state to the on state. That is, the VCSEL emits light by laser oscillation. Then, since the voltage (holding voltage Vr) to be applied to the setting thyristor S in the on state is 1.5 V, a voltage of 1.8 V is applied to a laser diode LD. Since the rising voltage of the VCSEL is 1.5 V, the VCSEL continuously emits light.

On the other hand, when the turn-on signal ϕI is set to 0 V, both ends of the series connection of the setting thyristor S and the VCSEL become 0 V. Then, the setting thyristor S transitions from the on state to the off state (turned off) and the VCSEL does not emit light.

The operation of the VCSEL array 10 will be described in detail below.

Configuration of Semiconductor Layer Stack

As described above, the semiconductor layer stack is configured such that the substrate 80, the p-anode layer 81, the n-gate layer 82, the p-gate layer 83, the n-cathode layer 84, the tunnel junction layer 85, the p-anode layer 86, the light-emitting layer 87, and the n-cathode layer 88 are stacked on one another.

As described above, the p-type GaAs will be described as an example of the substrate 80. Alternatively, the substrate 80 may be n-type GaAs or intrinsic (i) GaAs with no impurity doped. Alternatively, a semiconductor substrate composed of InP, GaN, InAs, or any other group III-V or II-VI material, sapphire, Si, Ge, or the like may be used. When the substrate is changed, a material that is monolithically stacked on the substrate is a material that substantially matches the lattice constant of the substrate (including a strain structure, a strain relaxation layer, and metamorphic growth). In one example, InAs, InAsSb, GaInAsSb, or the like is used on an InAs substrate, InP, InGaAsP, or the like is used on an InP substrate, GaN, AlGaN, InGaN is used on a GaN substrate or a sapphire substrate, and Si, SiGe, GaP, or the like is used on a Si substrate. When the substrate 80 is electrically insulating, there is a need for an additional wiring line for supplying the reference potential Vsub. When the semiconductor layer stack, except for the substrate 80, is attached to another supporting substrate and the semiconductor layer stack is formed on the other supporting substrate, the lattice constant does not need to be matched with that of the supporting substrate.

The p-anode layer 81 is, for example, p-type $Al_{0.9}GaAs$ having an impurity concentration of $1\times10^{18}/cm^3$. The Al composition may be changed in the range of 0 to 1.

The n-gate layer 82 is, for example, n-type $Al_{0.9}GaAs$ having an impurity concentration of $1\times10^{17}/cm^3$. The Al composition may be changed in the range of 0 to 1.

The p-gate layer 83 is, for example, p-type $Al_{0.9}GaAs$ having an impurity concentration of $1\times10^{17}/cm^3$. The Al composition may be changed in the range of 0 to 1.

The n-cathode layer 84 is, for example, n-type $Al_{0.9}GaAs$ having an impurity concentration of $1\times10^{18}/cm^3$. The Al composition may be changed in the range of 0 to 1.

The tunnel junction layer 85 is composed of a junction between the $n^{++}$ layer 85a doped with an n-type impurity at a high concentration and the $p^{++}$ layer 85b doped with an n-type impurity at a high concentration (see FIG. 9A). The $n^{++}$ layer 85a and the $p^{++}$ layer 85b are high in concentration, for example, an impurity concentration of $1\times10^{20}/cm^3$. The impurity concentration of a normal junction is in the order of $10^{17}/cm^3$ to $10^{18}/cm^3$. Examples of the combination of the $n^{++}$ layer 85a and the $p^{++}$ layer 85b (hereinafter referred to as $n^{++}$ layer 85a/$p^{++}$ layer 85b) include $n^{++}$ GaInP/$p^{++}$ GaAs, $n^{++}$ GaInP/$p^{++}$ AlGaAs, $n^{++}$ GaAs/$p^{++}$ GaAs, $n^{++}$ AlGaAs/$p^{++}$ AlGaAs, $n^{++}$ InGaAs/$p^{++}$ InGaAs, $n^{++}$ GaInAsP/$p^{++}$ GaInAsP, and $n^{++}$ GaAsSb/$p^{++}$ GaAsSb. The combinations may be mutually changed.

The p-anode layer 86 is configured such that the lower p-anode layer 86a, the current confinement layer 86b, and the upper p-anode layer 86c are stacked on one another in sequence. The lower p-anode layer 86a and the upper p-anode layer 86c are, for example, p-type $Al_{0.9}GaAs$ having an impurity concentration of $5\times10^{17}/cm^3$. The Al composition may be changed in the range of 0 to 1.

The current confinement layer 86b is, for example, p-type AlGaAs having a high AlAs or Al impurity concentration. It is desirable that Al be oxidized to form $Al_2O_3$, thereby increasing the electrical resistance and forming the current blocking region 86e. The current blocking region 86e may be formed by implanting hydrogen ion ($H^+$) into a semiconductor layer such as a GaAs or AlGaAs layer ($H^+$ ion implantation).

The light-emitting layer 87 has a quantum well structure in which well layers and barrier layers are alternately stacked on each other. Examples of the well layers include GaAs, AlGaAs, InGaAs, GaAsP, AlGaInP, GaInAsP, and GaInP layers, and examples of the barrier layers include AlGaAs, GaAs, GaInP, and GaInAsP layers. The light-emitting layer 87 may be a quantum line (quantum wire) or a quantum box (quantum dot).

The n-cathode layer 88 is, for example, n-type $Al_{0.9}GaAs$ having an impurity concentration of $5\times10^{17}/cm^3$. The Al composition may be changed in the range of 0 to 1.

These semiconductor layers are stacked by using, for example, metal organic chemical vapor deposition (MOCVD), molecular beam epitaxy (MBE), or any other suitable technique to form a semiconductor layer stack.

Instead of the AlGaAs-based material described above, GaInP or the like may be used. Alternatively, a GaN substrate or an InP-based substrate may be used. The VCSEL including the p-anode layer 86, the light-emitting layer 87, and the n-cathode layer 88, and the setting thyristor S and the transfer thyristor T including the p-anode layer 81, the n-gate layer 82, the p-gate layer 83, and the n-cathode layer 84 may be composed of materials having different lattice constants. This can be realized by metamorphic growth or by causing the setting thyristor S and the transfer thyristor T to be separately grown from the VCSEL and attaching them to one another. In this case, the lattice constant of the tunnel junction layer 85 may be substantially matched with that of either of the setting thyristor S and the transfer thyristor T or the VCSEL.

The VCSEL array 10 may be manufactured using a known technique such as photolithography or etching, and the manufacturing method will not be described.

Operation of VCSEL Array 10

Figure 10:
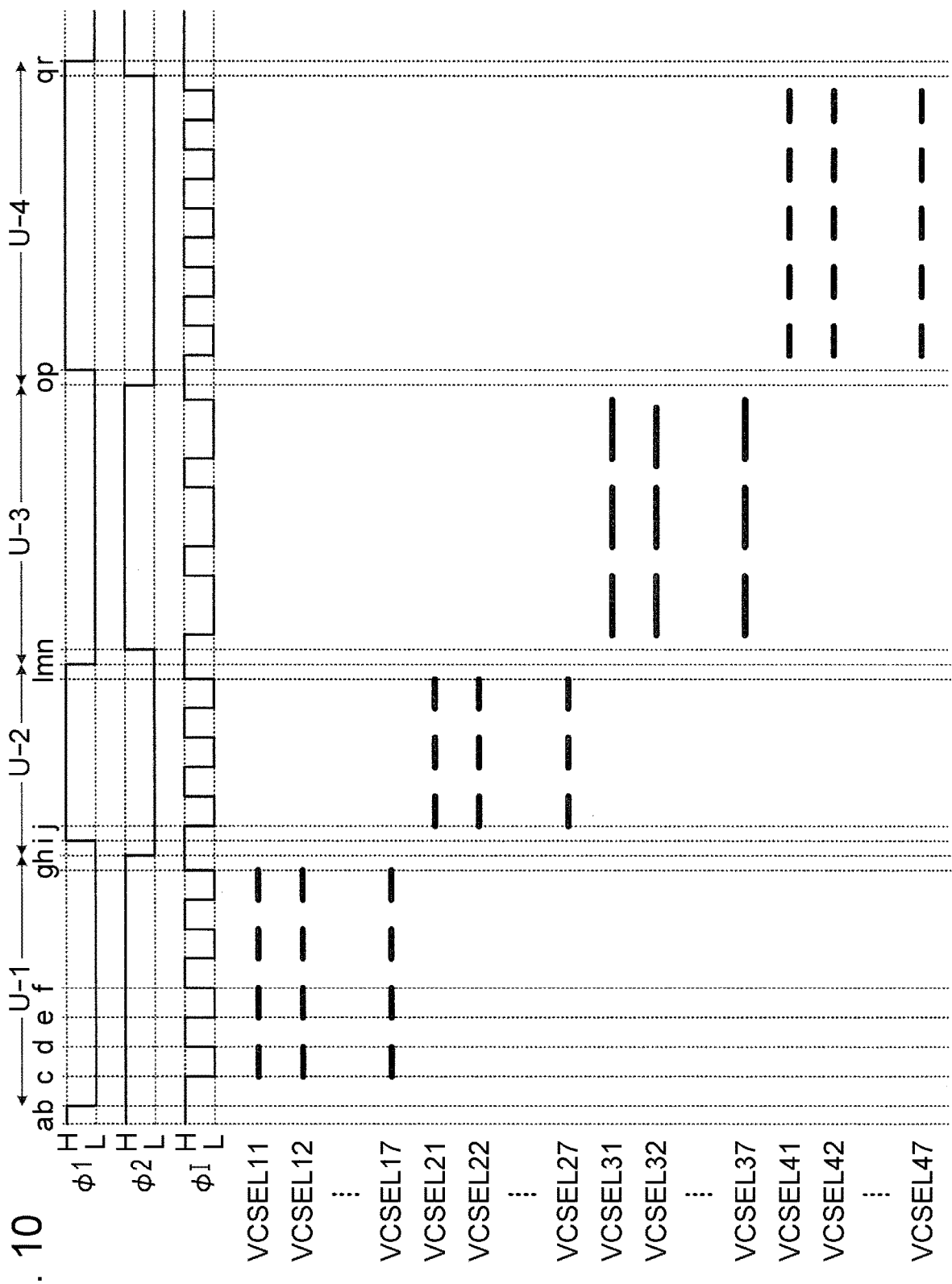
FIG. 10 illustrates an example time chart for controlling light emission/non-light emission of a VCSEL group in the VCSEL array.

FIG. 10 illustrates an example time chart for controlling light emission/non-light emission of the VCSEL groups in the VCSEL array 10. A case where each VCSEL group described with reference to FIGS. 6 and 7 includes seven VCSELs will be described as an example. In FIG. 10, it is assumed that time passes in alphabetical order (a, b, c, etc.). The timing chart illustrated in FIG. 10 illustrates a portion for controlling the VCSEL groups #1 to #4. Periods during which the VCSEL groups #1 to #4 sequentially emit light are referred to as periods U-1 to U-4. In the illustrated example, as described below, the periods U-1 to U-4 have different lengths, but may have the same length.

The time chart illustrated in FIG. 10 will be described with reference to FIG. 6.

At time a, power is supplied to the control unit 50 illustrated in FIG. 6. Then, the reference potential Vsub is set to "H (0 V)", and the power supply potential Vgk is set to "L (−3.3 V)".

Next, the waveforms of the signals (the transfer signals φ1 and φ2 and the turn-on signal φI) will be described. Since the operations in the periods U-1 to U-8 are fundamentally the same, the period U-1 will be mainly described. The periods U-1 to U-8 are represented as a period U when they are not distinguished from each other.

The transfer signal φ1 is a signal set to "H (0 V)" or "L (−3.3 V)". The transfer signal φ1 is "H (0 V)" at time a, and transitions to "L (−3.3 V)" at time b. Then, at time i, the transfer signal φ1 is set to "H (0 V)" again. At time m, the transfer signal φ1 transitions to "L (−3.3 V)" again. The transfer signal φ2 is also a signal set to "H (0 V)" or "L (−3.3 V)". The transfer signal φ2 is "H (0 V)" at time a, and transitions to "L (−3.3 V)" at time h. Then, at time n, the transfer signal φ2 is set to "H (0 V)" again.

After time b, the states of the transfer signals φ1 and φ2 are alternately switched to "H (0 V)" and "L (−3.3 V)" with a period therebetween during which the transfer signals φ1 and φ2 are "L (−3.3 V)" (for example, the period from time h to time i). Accordingly, the period from time b at which the transfer signal φ1 transitions from "H (0 V)" to "L (−3.3 V)" to time h at which the transfer signal φ2 transitions from "H (0 V)" to "L (−3.3 V)" is referred to as the period U-1, and the period from time h at which the transfer signal φ2 transitions from "H (0 V)" to "L (−3.3 V)" to time m at which the transfer signal φ1 transitions from "H (0 V)" to "L (−3.3 V)" is referred to as the period U-2. The same applies to the periods U-3 and U-4.

The turn-on signal φI is a signal set to "H (0 V)" or "L (−3.3 V)". In each period U, the turn-on signal φI is repeatedly set to "H (0 V)" and "L (−3.3 V)" in a period during which one of the transfer signals φ1 and φ2 is "H (0 V)" and the other transfer signal is "L (−3.3 V)", for example, from time c to time g in the period U-1 or from time j to time 1 in the period U-2. The turn-on signal φI remains "H (0 V)" in the other periods.

Next, the time chart illustrated in FIG. 10 will be described with reference to FIG. 6. In FIG. 10, a period during which the VCSEL emits light is indicated by a solid line.

At time a, power is supplied to the control unit 50 illustrated in FIG. 6, the reference potential Vsub is set to "H (0 V)", and the power supply potential Vgk is set to "L (−3.3 V)". Then, the transfer signals φ1 and φ2 are set to "H (0 V)". The cathode of the start diode SD becomes the power supply potential Vgk ("L (−3.3 V)") via the power supply line resistor Rg1, and the anode of the start diode SD becomes the transfer signal φ2 "H (0 V)" via the current-limiting resistor R2. Accordingly, the start diode SD is forward biased, and the gate Gt1 of the transfer thyristor T1 becomes −1.5 V. As a result, the threshold voltage of the transfer thyristor T1 is −3 V.

At time b, the transfer signal φ1 transitions from "H (0 V)" to "L (−3.3 V)". At this time, since the threshold voltage of the transfer thyristor T1 is −3 V, the transfer thyristor T1 is turned on and transitions from the off state to the on state. Then, the gate Gt1 becomes 0 V. Accordingly, the gate Gs1 of the setting thyristor S1 connected to the gate Gt1 becomes 0 V. Then, the threshold voltage of the setting thyristor S1 is −1.5 V. At time b, the turn-on signal φI is "H (0 V)". That is, a voltage of 0 V is applied to the series connection of the setting thyristor S1 and the VCSELs 11 to 17. Thus, the setting thyristor S1 is in the off state, and the VCSELs 11 to 17 do not emit light.

At time c, when the turn-on signal φ1 transitions from "H (0 V)" to "L (−3.3 V)", the setting thyristor S1 having a threshold voltage of −1.5 V is turned on and transitions from the off state to the on state. Then, as described above, current flows through the VCSELs 11 to 17, and the VCSELs 11 to 17 emit light. At this time, the voltage between the cathode and the anode of the setting thyristor S1 is 1.5 V, and the voltage between the cathode and the anode of the VCSELs 11 to 17 is 1.8 V. Accordingly, the light emission of the VCSELs 11 to 17 is maintained. That is, at time c, the VCSELs 11 to 17 belonging to the VCSEL group #1 emit light in parallel.

At time d, when the turn-on signal φI transitions from "L (−3.3 V)" to "H (0 V)", both ends of the series connection of the setting thyristor S1 and the VCSELs 11 to 17 are 0 V, and the setting thyristor S1 is turned off and transitions from the on state to the off state. In addition, the VCSELs 11 to 17 are turned off. That is, at time d, the VCSELs 11 to 17 belonging to the VCSEL group #1 do not emit light in parallel. However, the threshold voltage of the setting thyristor S1 is maintained at −3 V.

Accordingly, at time e, when the turn-on signal φI transitions from "H (0 V)" to "L (−3.3 V)", the setting thyristor S1 having a threshold voltage of −3 V is again turned on and transitions from the off state to the on state, and the VCSELs 11 to 17 emit light.

At time f, when the turn-on signal φI transitions from "L (−3.3 V)" to "H (0 V)", the setting thyristor S1 is again turned off and transitions from the on state to the off state, and the VCSELs 11 to 17 are turned off.

That is, in the period U-1 from time b at which the transfer signal φ1 transitions from "H (0 V)" to "L (−3.3 V)" to time h at which the transfer signal φ2 transitions from "H (0 V)" to "L (−3.3 V)", a transition of the turn-on signal φI from "H (0 V)" to "L (−3.3 V)" and then from "L (−3.3 V)" to "H (0 V)" is repeatedly performed, thereby allowing the VCSELs 11 to 17 belonging to the VCSEL group #1 to emit light in a pulsed manner (intermittently) in parallel. In the period U-1, light is emitted as four pulses.

Likewise, in the period U-2 from time h to time m, the VCSELs 21 to 27 belonging to the VCSEL group #2 emit light as three pulses in parallel. In the period U-3 from time m to time o, the VCSELs 31 to 37 belonging to the VCSEL group #3 emit light as three pulses in parallel. The light emission time per pulse in the period U-3 is set to be longer than that in the periods U-1 and U-2. In the period U-4 from time o to time r, the VCSELs 41 to 47 belonging to the VCSEL group #4 emit light as five pulses in parallel. The light emission time per pulse in the period U-4 is set to be shorter than that of the periods U-1 and U-2.

In the foregoing description, a plurality of pulses are emitted during each period U. Alternatively, a single pulse may be emitted during each period U. In each period U, maintaining the turn-on signal φI at "H (0 V)" allows both ends of the series connection of the setting thyristor S and the VCSEL group to remain at 0 V. Accordingly, the VCSEL group does not emit light. That is, the VCSEL group may be kept in a non-emission state during a predetermined period U.

At time b, the gate Gt1 of the transfer thyristor T1 becomes 0 V, and setting the gate Gs1 to 0 V via the wiring line 75-1 is a light-emission instruction from the transfer thyristor T1. The same applies to the other cases.

As described above, with the use of the drive unit 11, the on state is sequentially propagated across the adjacent transfer thyristors T, thereby performing turn-on control of the VCSEL groups, that is, providing a light-emission instruction to the VCSEL groups. The sequential propagation of the on state across the adjacent transfer thyristors T is referred to as self-scanning. A light-emitting element array in which self-scanning is performed, such as the VCSEL array 10, is sometimes referred to as a self-scanning light-emitting device array (self-scanning light emitting device (SLED)). This facilitates the control of the light-emitting element array.

A light-emission instruction unit may be disposed for each VCSEL group without using self-scanning. It is sufficient that VCSEL groups be sequentially provided with a light-emission instruction.

Further, causing a plurality of VCSELs belonging to each VCSEL group to emit light in parallel prevents deterioration of the light emission characteristics of the VCSELs, such as non-uniformity in light emission, distortion of the light emission profile, or an increase in the angle of divergence, compared with the case where the size of the light-emitting point is increased to increase the optical output.

Arrangement of VCSEL Groups

Figure 11:
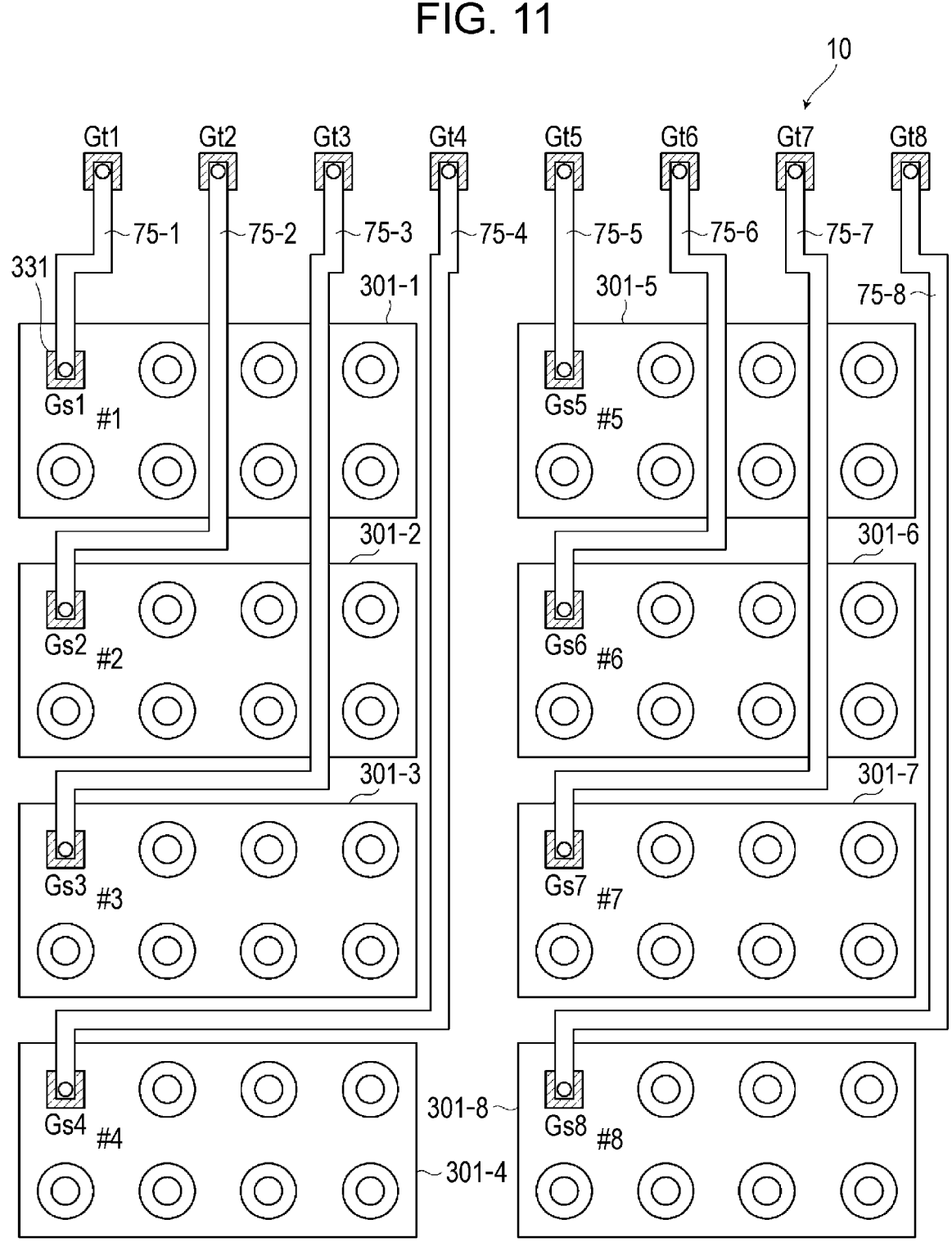
FIG. 11 illustrates the arrangement of VCSEL groups in a VCSEL array to which the first exemplary embodiment is applied.

FIG. 11 illustrates the arrangement of the VCSEL groups in the VCSEL array 10 according to the first exemplary embodiment. In FIG. 11, in one example, as illustrated in FIGS. 4A and 7, the VCSEL array 10 includes eight VCSEL groups. In FIG. 11, the connection relationship between the gates Gt of the transfer thyristors T in the islands 302 and the gates Gs of the setting thyristors S in the islands 301 illustrated in FIG. 7 is extracted and illustrated.

As illustrated in FIG. 11, the islands 301-1 to 301-4 are arranged in the negative x direction, and the islands 301-5 to 301-8 are arranged in the negative x direction. The arrangement of the islands 301-1 to 301-4 and the arrangement of the islands 301-5 to 301-8 are arranged in parallel in the negative y direction. With this configuration, the wiring lines 75 (the wiring lines 75-1 to 75-8) that connect the gates Gt1 to Gt8 to the gates Gs1 to Gs8 are disposed without intersecting or being close to each other.

In the arrangement illustrated in FIG. 11, the on states of the transfer thyristors T are sequentially transferred in the negative y direction, thereby sequentially controlling the turning on of the VCSEL groups in the negative x direction. That is, in the VCSEL groups, after the turning on of the VCSEL group #1 to the VCSEL group #4 is sequentially controlled in the negative x direction (after the turning on of the VCSEL group #1 to the VCSEL group #4 is completed), and the turning on of the VCSEL group #5 to the VCSEL group #8 is sequentially controlled in the negative x direction. That is, turn-on control is performed in the direction (the negative x direction) perpendicular to the direction (the negative y direction) in which the on states of the transfer thyristors T are transferred. The VCSEL groups #1 to #4 are an example of a first light-emitting element group row, and the VCSEL groups #5 to #8 are an example of a second light-emitting element group row.

Figure 12:
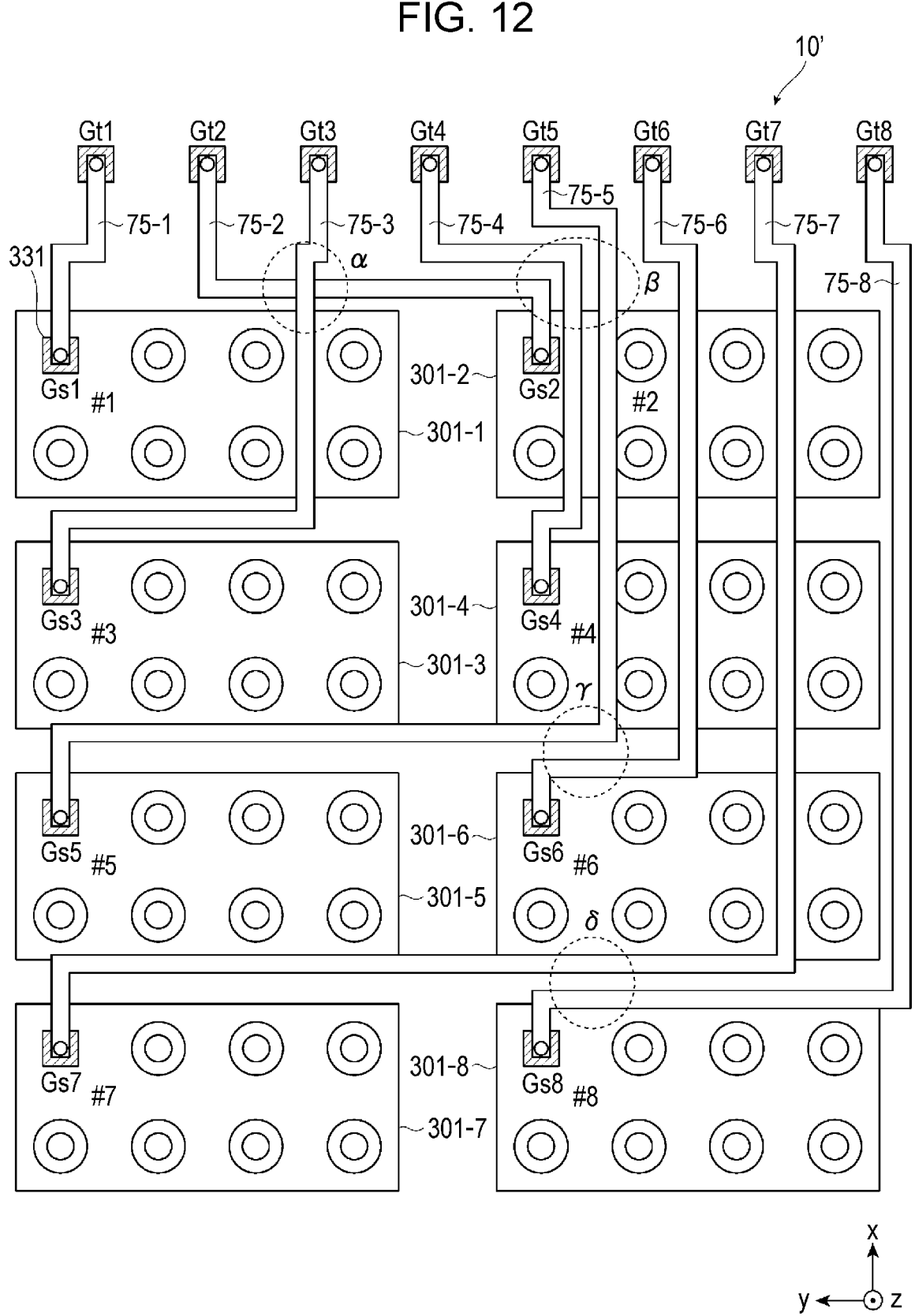
FIG. 12 illustrates the arrangement of VCSEL groups in a VCSEL array for comparison to which the first exemplary embodiment is not applied.

FIG. 12 illustrates the arrangement of VCSEL groups in a VCSEL array 10' for comparison to which the first exemplary embodiment is not applied. Also in the VCSEL array 10' illustrated in FIG. 12, the connection relationship between the gates Gt of the transfer thyristors T in the islands 302 and the gates Gs of the setting thyristors S in the islands 301 is extracted and illustrated.

As illustrated in FIG. 12, the islands 301-1 and 301-2 are arranged in the negative y direction, the islands 301-3 and 301-4 are arranged in the negative y direction, the islands 301-5 and 301-6 are arranged in the negative y direction, and the islands 301-7 and 301-8 are arranged in the negative y direction. The arrangement of the islands 301-1 and 301-2, the arrangement of the islands 301-3 and 301-4, the arrangement of the islands 301-5 and 301-6, and the arrangement of the islands 301-7 and 301-8 are arranged in the negative x direction. With this configuration, the on states of the transfer thyristors T are sequentially transferred in the negative y direction, thereby sequentially controlling the VCSEL groups in the arrangement region 100 to be turned on in the negative y direction. That is, after the turning on of the VCSEL group #1 and the VCSEL group #2 is sequentially controlled in the negative y direction (after the turning on of the VCSEL group #1 and the VCSEL group #2 is completed), the turning on of the VCSEL group #3 and the VCSEL group #4 is sequentially controlled in the negative y direction. The same applies to the VCSEL groups #5 to #8. That is, turn-on control is performed in the direction (the negative y direction) parallel to the direction (the negative y direction) in which the on states of the transfer thyristors T are transferred.

In the VCSEL array 10', however, the wiring line 75-2 that connects the gate Gt2 to the gate Gs2 and the wiring line 75-3 that connects the gate Gt3 to the gate Gs3 intersect (a location indicated by α). In addition, the wiring line 75-2 that connects the gate Gt2 to the gate Gs2, the wiring line 75-4 that connects the gate Gt4 to the gate Gs4, and the wiring line 75-5 that connects the gate Gt5 to the gate Gs5 are close to one another (a location indicated by β). Further, the wiring line 75-5 that connects the gate Gt5 to the gate Gs5 and the wiring line 75-6 that connects the gate Gt6 to the gate Gs6 are close to each other (a location indicated by γ). Further, the wiring line 75-7 that connects the gate Gt7 to the gate Gs7 and the wiring line 75-8 that connects the gate Gt8 to the gate Gs8 are close to each other (a location indicated by δ).

In the arrangement illustrated in FIG. 12, turn-on control is performed in the direction (the negative y direction) parallel to the direction (the negative y direction) in which the on states of the transfer thyristors T are transferred. However, the wiring lines 75 that connect the gates Gt of the transfer thyristors T in the islands 302 to the gates Gs of the setting thyristors S in the islands 301 intersect or are close to each other, and thus the wiring lines 75 are not easily formed.

As described above, as in the VCSEL array 10 illustrated in FIG. 11 to which the first exemplary embodiment is applied, turn-on control of the VCSEL groups is performed in the direction perpendicular to the direction in which the on states of the transfer thyristors T are transferred, thereby facilitating the formation of the wiring lines 75 that connect the gates Gt of the transfer thyristors T in the islands 302 to the gates Gs of the setting thyristors S in the islands 301 without intersecting or being close to each other.

In FIG. 11, the VCSEL groups are controlled to be turned on in the negative x direction. Alternatively, the VCSEL groups and the wiring lines 75 may be arranged such that the VCSEL groups are controlled to be turned on in the positive x direction.

Second Exemplary Embodiment

In the VCSEL array 10 to which the first exemplary embodiment is applied, turn-on control of the VCSEL groups is performed in the direction perpendicular to the direction in which the on states of the transfer thyristors T are transferred. In the VCSEL array 10, turn-on control of the VCSEL groups is performed in one direction perpendicular to the direction in which the on states of the transfer thyristors T are transferred. In a VCSEL array 20 to which a second exemplary embodiment is applied, turn-on control of the VCSEL groups is performed so as to alternately reciprocate in the direction perpendicular to the direction in which the on states of the transfer thyristors T are transferred. Other configuration is similar to that of the first exemplary embodiment and will not be described, and a different portion, namely, the arrangement of the VCSEL groups in the VCSEL array 20, will be described. Members having the same function are assigned the same numerals.

Arrangement of VCSEL Groups

Figure 13:
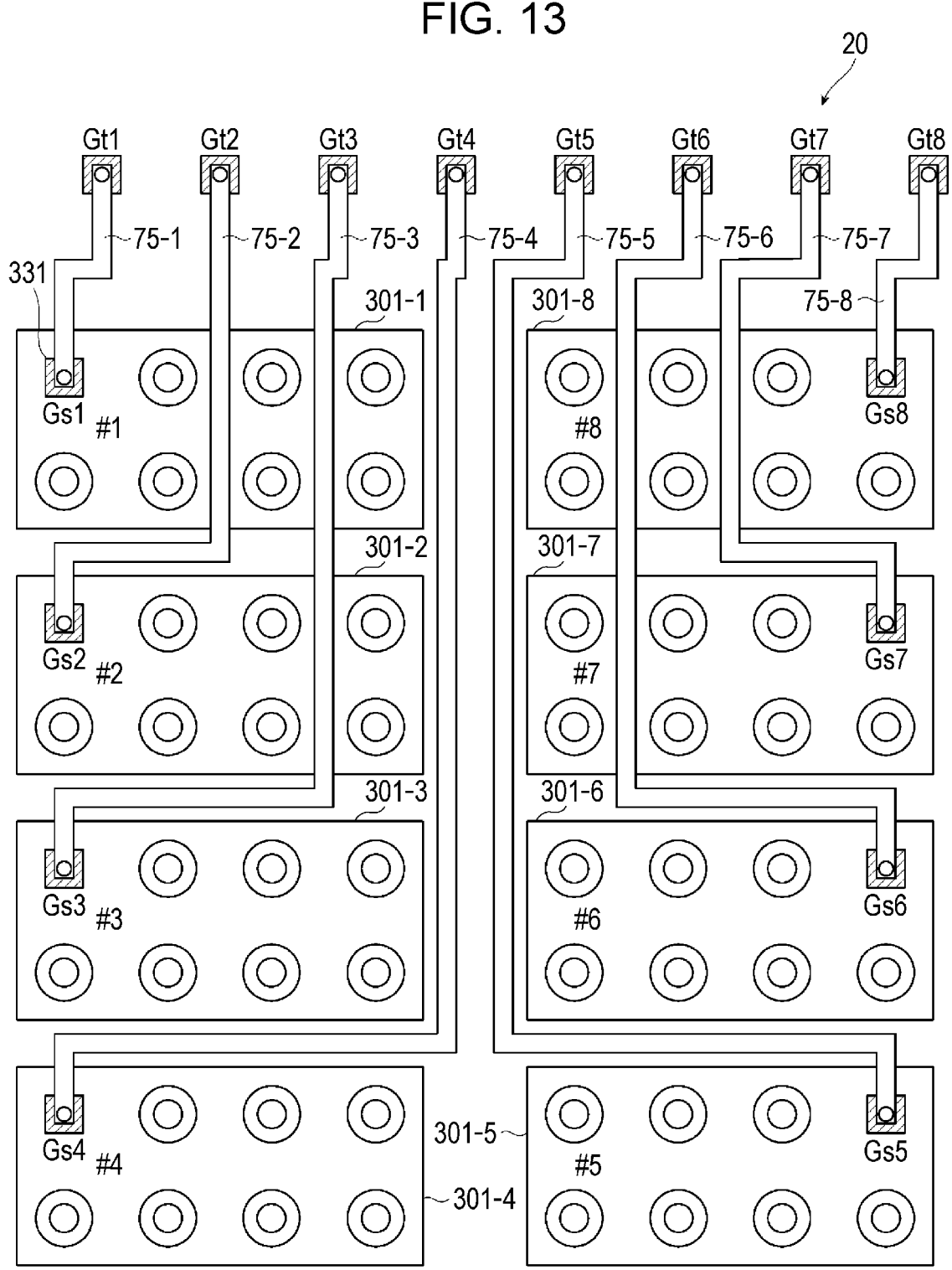
FIG. 13 illustrates the arrangement of VCSEL groups in a VCSEL array to which a second exemplary embodiment is applied.

FIG. 13 illustrates the arrangement of VCSEL groups in the VCSEL array 20 to which the second exemplary embodiment is applied. In FIG. 13, as illustrated in FIGS. 4A and 7 for the first exemplary embodiment, the VCSEL array 20 includes eight VCSEL groups. Also in FIG. 13, the connection relationship between the gates Gt of the transfer thyristors T in the islands 302 and the gates Gs of the setting thyristors S in the islands 301 is extracted and illustrated.

As illustrated in FIG. 13, the islands 301-1 to 301-4 are arranged in the negative x direction, and the islands 301-5 to 301-8 are arranged in the positive x direction. The islands 301-5 to 301-8 have a planar structure obtained by inverting the islands 301-5 to 301-8 according to the first exemplary embodiment illustrated in FIG. 11 in the y direction. With this configuration, the wiring lines 75 (the wiring lines 75-1 to 75-8) that connect the gates Gt1 to Gt8 to the gates Gs1 to Gs8 are formed without intersecting or being close to each other.

When the on states of the transfer thyristors T are sequentially transferred in the negative y direction, in the arrangement region 100, the VCSEL groups #1 to #4 are sequentially controlled to be turned on in the negative x direction. Then, the VCSEL groups #5 to #8 are sequentially controlled to be turned on in the positive x direction. That is, in the VCSEL array 20 according to the second exemplary embodiment, turn-on control of the VCSEL groups is alternately performed in the direction perpendicular to the direction in which the on states of the transfer thyristors T are transferred, namely, in the negative x direction and the positive x direction. The wiring lines that connect the gates Gt of the transfer thyristors T in the islands 302 to the gates Gs of the setting thyristors S in the islands 301 are formed without intersecting or being close to each other.

In the first and second exemplary embodiments, the VCSEL arrays 10 and 20 have a structure in which the VCSELs are stacked on the setting thyristors S on the substrate 80 side. The VCSEL arrays 10 and 20 may have a structure in which the setting thyristors S are stacked on the VCSELs on the substrate 80 side.

While the VCSELs are controlled between the light-emitting state and the non-light-emitting state, the VCSELs may be controlled in advance to be in the light-emitting state with a small amount of light such that the amount of light is increased when the setting thyristors S transition from the off state to the on state. Alternatively, the VCSEL groups that are sequentially turned on may be controlled such that the light-emitting states thereof overlap.

In the first and second exemplary embodiments, turn-on control of the VCSEL groups is sequentially performed by self-scanning using the drive unit 11 including the transfer thyristors T whose on states are sequentially transferred. This configuration facilitates the turn-on control of the VCSEL groups. It is desirable that the drive unit 11 control the VCSEL group to be turned on independently of one another. In addition, the VCSEL groups do not need to be driven in sequence. The drive unit 11 may include transistors each disposed for one VCSEL group, instead of the transfer thyristors T or the like.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting element array comprising:
a plurality of transfer thyristors arranged in a first direction;
a first light-emitting element group row including light-emitting element groups each including a plurality of light-emitting elements such that the light-emitting element groups are arranged in a direction intersecting the first direction;
a second light-emitting element group row including light-emitting element groups each including a plurality of light-emitting elements such that the second light-emitting element group row is arranged along the first light-emitting element group row in the first direction; and
a plurality of wiring lines that connect the plurality of transfer thyristors to the light-emitting element groups in the first light-emitting element group row and the light-emitting element groups in the second light-emitting element group row to provide a light-emission instruction,
the plurality of wiring lines being connected such that in response to the plurality of transfer thyristors sequentially providing a light-emission instruction in the first direction, the light-emitting element groups in the first light-emitting element group row sequentially emit light in the direction intersecting the first direction and, after turning on of the first light-emitting element group row is completed, the light-emitting element groups in the second light-emitting element group row sequentially emit light in the direction intersecting the first direction.

2. The light-emitting element array according to claim 1, wherein
the first light-emitting element group row and the second light-emitting element group row are adjacent to each other, and
the plurality of wiring lines are connected such that a direction in which the light-emitting element groups in the first light-emitting element group row sequentially emit light is identical to a direction in which the light-emitting element groups in the second light-emitting element group row sequentially emit light.

3. The light-emitting element array according to claim 1, wherein
the first light-emitting element group row and the second light-emitting element group row are adjacent to each other, and the plurality of wiring lines are connected such that a direction in which the light-emitting element groups in the first light-emitting element group row sequentially emit light is opposite to a direction in which the light-emitting element groups in the second light-emitting element group row sequentially emit light.

4. The light-emitting element array according to claim 1, wherein
the plurality of wiring lines that connect the plurality of transfer thyristors to the light-emitting element groups in the first light-emitting element group row and the light-emitting element groups in the second light-emitting element group row to provide a light-emission instruction do not intersect.

5. The light-emitting element array according to claim 2, wherein
the plurality of wiring lines that connect the plurality of transfer thyristors to the light-emitting element groups in the first light-emitting element group row and the light-emitting element groups in the second light-emitting element group row to provide a light-emission instruction do not intersect.

6. The light-emitting element array according to claim 3, wherein
the plurality of wiring lines that connect the plurality of transfer thyristors to the light-emitting element groups in the first light-emitting element group row and the light-emitting element groups in the second light-emitting element group row to provide a light-emission instruction do not intersect.

7. The light-emitting element array according to claim 1, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

8. The light-emitting element array according to claim 2, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

9. The light-emitting element array according to claim 3, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

10. The light-emitting element array according to claim 4, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

11. The light-emitting element array according to claim 5, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

12. The light-emitting element array according to claim 6, wherein
the plurality of wiring lines that connect the plurality of transfer thyristors to the light-emitting element groups in the first light-emitting element group row and the light-emitting element groups in the second light-emitting element group row to provide a light-emission instruction are disposed such that at most one wiring line is provided between light-emitting elements in the light-emitting element groups in the first light-emitting element group row and the light-emitting element groups in the second light-emitting element group row.

13. The light-emitting element array according to claim 1, wherein
the plurality of transfer thyristors sequentially provide a light-emission instruction via self-scanning.

14. A light emitting device comprising:
the light-emitting element array according to claim 1; and
a circular optical element having a size such that the optical element includes the light-emitting element groups in the first light-emitting element group row and the light-emitting element groups in the second light-emitting element group row included in the light-emitting element array, the optical element being disposed in a light-emission path of the light-emitting element groups.

15. The light emitting device according to claim 14, wherein
the optical element comprises a lens that narrows an angle of divergence of light emitted from the light-emitting element groups in the first light-emitting element group row and the light-emitting element groups in the second light-emitting element group row.

16. The light emitting device according to claim 14, further comprising
a diffusion member that diffuses light emitted from the light-emitting element groups in the first light-emitting element group row and the light-emitting element groups in the second light-emitting element group row and transmitted through the optical element and emits the diffused light.

17. The light emitting device according to claim 14, further comprising a diffractive member that diffracts light emitted from the light-emitting element groups in the first light-emitting element group row and the light-emitting element groups in the second light-emitting element group row and transmitted through the optical element and emits the diffracted light.

18. An optical device comprising:

the light emitting device according to claim 14; and a sensor that receives light reflected by a measurement target object irradiated with light emitted from the light-emitting element groups in the first light-emitting element group row and the light-emitting element groups in the second light-emitting element group row included in the light emitting device.

19. A measurement device comprising:

the optical device according to claim 18; and a circuit that measures a three-dimensional shape based on a time from when light is emitted from the light-emitting element groups in the first light-emitting element group row and the light-emitting element groups in the second light-emitting element group row included in the optical device to when the light is received by the sensor included in the optical device to specify a three-dimensional shape of the measurement target object.

20. An information processing apparatus comprising:

the measurement device according to claim 19; and a processor that performs an authentication process for using the information processing apparatus in accordance with the three-dimensional shape specified by the circuit included in the measurement device.

* * * * *